(12) United States Patent
Nishida et al.

(10) Patent No.: US 12,307,445 B2
(45) Date of Patent: May 20, 2025

(54) INFORMATION TRANSACTION METHOD, INFORMATION USER TERMINAL, AND RECORDING MEDIUM

(71) Applicant: Panasonic Intellectual Property Corporation of America, Torrance, CA (US)

(72) Inventors: Naohisa Nishida, Osaka (JP); Yuji Unagami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 482 days.

(21) Appl. No.: 17/521,018

(22) Filed: Nov. 8, 2021

(65) Prior Publication Data

US 2022/0058643 A1    Feb. 24, 2022

Related U.S. Application Data

(63) Continuation of application No. PCT/JP2020/019169, filed on May 13, 2020.
(Continued)

(51) Int. Cl.
*G06Q 20/38* (2012.01)
*G06Q 20/06* (2012.01)
*G06Q 20/40* (2012.01)

(52) U.S. Cl.
CPC ....... *G06Q 20/3829* (2013.01); *G06Q 20/065* (2013.01); *G06Q 20/38215* (2013.01); *G06Q 20/3827* (2013.01); *G06Q 20/4014* (2013.01)

(58) Field of Classification Search
CPC ............ G06Q 20/3829; G06Q 20/065; G06Q 20/38215; G06Q 20/3827; G06Q 20/4014;
(Continued)

(56) References Cited

U.S. PATENT DOCUMENTS 8,412,947 B2 * 4/2013 Pizano .................. H04L 9/0816
726/28
9,106,911 B2 * 8/2015 Kishigami ........... H04N 19/114
(Continued)

FOREIGN PATENT DOCUMENTS

CN          108615148        10/2018
WO       2019/072823         4/2019
(Continued)

OTHER PUBLICATIONS

Hepp, Thomas, Sharinghousen, Matthew, Ehret, Philip, Schoenhals, Alexander and Gipp, Bela. "On-chain vs. off-chain storage for supply- and blockchain integration" it—Information Technology, vol. 60, No. 5-6, 2018, pp. 283-291. https://doi.org/10.1515/itit-2018-0019 (Year: 2018).*
(Continued)

*Primary Examiner* — Neha Patel
*Assistant Examiner* — Jahed Ali
(74) *Attorney, Agent, or Firm* — Wenderoth, Lind & Ponack, L.L.P.

(57) ABSTRACT

An information transaction method of the present disclosure includes an information providing phase of providing, by an information provider, information requested by an information user via a distributed ledger of authentication server devices. In the information providing phase, an information provider terminal acquires first transaction data including an information user ID, an information provider ID, and a second information index indicating an index of first information requested by the information user among information items indicated by the first information index published in the distributed ledger, the first transaction data being written in the distributed ledger. The information provider terminal generates first encrypted information by encrypting the first information designated by the second information
(Continued)

index, generates second transaction data including the information provider ID, the information user ID, and the first encrypted information, and transmits the second transaction data to an authentication server device.

19 Claims, 22 Drawing Sheets

Related U.S. Application Data

(60) Provisional application No. 62/847,440, filed on May 14, 2019.

(58) Field of Classification Search
CPC .. G06Q 20/223; G06Q 20/382; G06Q 20/383; G06Q 20/389; G06Q 20/405; G06F 21/602; G06F 21/64; G06F 16/27; G06F 21/44; G06F 21/6218
See application file for complete search history.

(56) References Cited

U.S. PATENT DOCUMENTS

| | | | | |
|---|---|---|---|---|
| 2018/0026979 | A1* | 1/2018 | Cox | H04L 63/0428 713/165 |
| 2018/0285839 | A1* | 10/2018 | Yang | G06Q 20/40 |
| 2019/0028277 | A1* | 1/2019 | Jayachandran | H04L 9/3247 |
| 2019/0384932 | A1* | 12/2019 | Pratt | H04W 12/61 |
| 2020/0089720 | A1* | 3/2020 | Dallara | G06Q 20/381 |
| 2020/0202333 | A1* | 6/2020 | Tadayon | G06Q 20/405 |
| 2021/0004788 | A1* | 1/2021 | Kim | G06Q 20/32 |
| 2021/0027289 | A1* | 1/2021 | Guo | H04L 9/3247 |
| 2021/0092613 | A1* | 3/2021 | Palyutina | G06Q 50/265 |
| 2022/0058643 | A1* | 2/2022 | Nishida | G06F 21/64 |
| 2022/0156743 | A1* | 5/2022 | Oyamatsu | G06Q 30/0609 |

FOREIGN PATENT DOCUMENTS

| | | | | |
|---|---|---|---|---|
| WO | WO-2019072823 | A1 * | 4/2019 | G06F 21/6209 |
| WO | WO-2019204794 | A1 * | 10/2019 | G06F 21/31 |

OTHER PUBLICATIONS

International Search Report issued Aug. 11, 2020 in International (PCT) Application No. PCT/JP2020/019169.
Nakamoto, Satoshi "Bitcoin: A Peer-to-Peer Electronic Cash System", (https://bitcoin.org/bitcoin.pdf).
Rivest, Ronald Linn et al., "A Method for Obtaining Digital Signatures and Public-Key Cryptosystems", 1977, (https://people.csail.mit.edu/rivest/Rsapaper.pdf).
Koblitz, Neal, "Elliptic Curve Cryptosystems", Mathematics of Computation, vol. 48, No. 177, pp. 203-209, Jan. 1987, (https://www.ams.org/journals/mcom/1987-48-177/S0025-5718-1987-0866109-5/).
Extended European Search Report issued Jun. 7, 2022 in corresponding European Patent Application No. 20806086.3.
Office Action mailed on Nov. 26, 2024 in Chinese Patent Application No. 202080034530.1, with English translation of Search Report.

* cited by examiner

FIG. 3A

```
{ Information provider ID : "P001",
  First information index : ["Age", "Gender", "Purchase history"],
  Access right information : [
    User IDs of users who can access "age" : [U001, U002, U003]
    User IDs of users who can access "gender" : [U002]
    User IDs of users who can access "purchase history" : [U001]
  ],
  Signature : "0xC08E0FF360"
}
```

FIG. 3B

```
{ Information provider ID : "P001",
  First information index : ["Age", "Gender", "Purchase history"],
  Access right information : [
    User attributes of users who can access "age" : [S001, S002, S003]
    User attributes of users who can access "gender" : [S002]
    User IDs of users who can access "purchase history" : [S001]
  ],
  Signature : "0xC08E0FF360"
}
```

FIG. 4

```
{ Information user ID : "U001", Information provider ID : "P001",
  Provided information (first encrypted information) : [
    Age : "0xad5f9e",
    Purchase history : ["0xd04f0a", "0xd98623"]
  ],
  Signature : "E4CC3D5CB9"
}
```

FIG. 6

```
{ Information user ID : "U001", Information provider ID : "P001",
Request information : ["Age", "Purchase history"], Encryption key : "0x123456", Signature : "800F09EC42"
}
```

INFORMATION TRANSACTION METHOD, INFORMATION USER TERMINAL, AND RECORDING MEDIUM

CROSS REFERENCE TO RELATED APPLICATIONS

This is a continuation application of PCT International Application No. PCT/JP2020/019169 filed on May 13, 2020, designating the United States of America, which is based on and claims priority of U.S. Provisional Patent Application No. 62/847,440 filed on May 14, 2019. The entire disclosures of the above-identified applications, including the specifications, drawings and claims are incorporated herein by reference in their entirety.

FIELD

The present disclosure relates to an information transaction method, an information user terminal, and a recording medium, and more particularly to an information transaction method for performing an information transaction using a blockchain, and an information user terminal and a recording medium that are used in the information transaction method.

BACKGROUND

In recent years, various companies provide services that use a blockchain.

Here, blockchain is a technology that is based on Bitcoin (see, for example, NPL (Non Patent Literature) 1). In a blockchain, units of data called blocks are generated and connected in the form of a chain, and thus a transaction history is stored. Accordingly, by using the blockchain, in a peer-to-peer (P2P) network in which anyone can participate, the transaction history (transaction data) is shared and mutually monitored by the participants, and thus reliability can be secured and tampering of the data can be prevented.

For example, as a service that protects a transaction history using a blockchain, there is a service or the like for transacting information via a blockchain, wherein an information provider registers information in a blockchain, and a user acquires the registered information via the blockchain.

CITATION LIST

Non Patent Literature

NPL 1: Satoshi Nakamoto, "Bitcoin: A Peer-to-Peer Electronic Cash System", (https://bitcoin.org/bitcoin.pdf)
NPL 2: Ronald Linn Rivest, et al., "A Method for Obtaining Digital Signatures and Public-Key Cryptosystems", (https://people.csail.mit.edu/rivest/Rsapaper.pdf)
NPL 3: Neal Koblitz, "Elliptic curve cryptosystems", (https://www.ams.org/journals/mcom/1987-48-177/S0025-5718-1 987-0866109-5/)

SUMMARY

Technical Problem

However, when the information provider registers information in a blockchain, because the information registered in the blockchain is public information, any user can acquire the information without a history being recorded. For this reason, there is a need for a technique for preventing information from being acquired without a history being recorded in the blockchain.

The present disclosure has been made in view of the circumstances described above, and it is an object of the present disclosure to provide an information transaction method and the like, with which information cannot be acquired without a history being recorded in a blockchain.

Solution to Problem

In order to solve the problem described above, an information transaction method according to an aspect of the present disclosure is an information transaction method for a system including an information provider terminal used by an information provider, an information user terminal used by an information user, and a plurality of authentication server devices that are communicable with the information provider terminal and the information user terminal via a network, the information transaction method including: an information providing phase of providing, by the information provider, information requested by the information user via a distributed ledger of one or more authentication server devices of the plurality of authentication server devices, wherein the information providing phase includes: acquiring, by the information provider terminal, first transaction data that includes an encryption key generated by the information user terminal, an information user ID that is an identifier for uniquely identifying the information user, an information provider ID that is an identifier for uniquely identifying the information provider, and a second information index that indicates an index of first information requested by the information user among information items indicated by a first information index published in the distributed ledger by the information provider, the first transaction data being written in the distributed ledger; generating, by the information provider terminal, first encrypted information by encrypting the first information designated by the second information index by using the encryption key; generating, by the information provider terminal, second transaction data that includes the information provider ID, the information user ID, and the first encrypted information; transmitting, by the information provider terminal, the second transaction data to the one or more authentication server devices; and updating, by the one or more authentication server devices, the distributed ledger after verifying the second transaction data to write the second transaction data into the distributed ledger.

Generic or specific aspects of the present disclosure may be implemented by a system, a method, an integrated circuit, a computer program, or a computer readable recording medium such as a CD-ROM, or may be implemented by any combination of a system, a method, an integrated circuit, a computer program, and a recording medium.

Advantageous Effects

According to the information transaction method and the like of the present disclosure, it is possible to prevent information from being acquired without a history being recorded in a blockchain.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 1 is a diagram schematically showing an overall configuration of an information transaction system according to an embodiment.

FIG. 3A is a diagram conceptually showing an example of a data structure of third transaction data according to the embodiment.

FIG. 3B is a diagram conceptually showing another example of the data structure of the third transaction data according to the embodiment.

FIG. 4 is a diagram conceptually showing an example of a data structure of second transaction data according to the embodiment.

FIG. 6 is a diagram conceptually showing an example of a data structure of first transaction data according to the embodiment.

DESCRIPTION OF EMBODIMENTS

Figure 1:
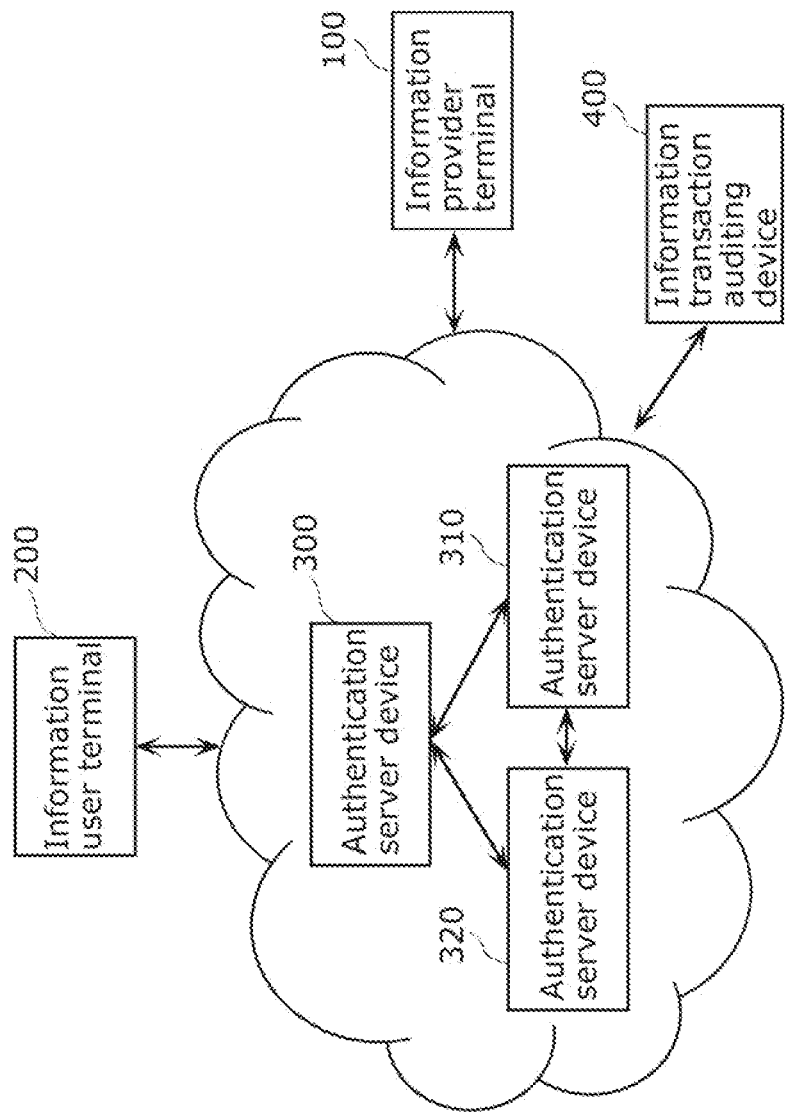

Underlying Knowledge Forming Basis of the Present Disclosure

As a service that uses a blockchain, there is, for example, a service that protects a transaction history by transacting information owned by an individual or an organization via a blockchain.

In this case, an information provider registers, in a blockchain, information owned by the information provider such as, for example, a web browsing history or a purchase history of the information provider. On the other hand, a user who wants to use the information acquires the information via the blockchain and records an acquisition history in the blockchain. Because the information is transacted via the blockchain in the manner described above, a third person can audit the information transaction by using the transaction history recorded in the blockchain. Accordingly, false information, such as an information transaction being not actually performed between the user and the information provider, or an information transaction being performed despite the fact that the information transaction was not actually performed, is unlikely to be generated, and thus the transaction history can be protected.

However, when the information provider registers information in a blockchain, because the information registered in the blockchain is public information, any user can acquire the information without a history being recorded. That is, a malicious user can commit an act of misconduct such as acquiring the information via the blockchain without an acquisition history being recording in the blockchain.

For this reason, there is a need for a technique for preventing information from being acquired without a history being recorded in a blockchain.

Accordingly, an information transaction method according to an aspect of the present disclosure is an information transaction method for a system including an information provider terminal used by an information provider, an information user terminal used by an information user, and a plurality of authentication server devices that are communicable with the information provider terminal and the information user terminal via a network, the information transaction method including: an information providing phase of providing, by the information provider, information requested by the information user via a distributed ledger of one or more authentication server devices of the plurality of authentication server devices, wherein the information providing phase includes: acquiring, by the information provider terminal, first transaction data that includes an encryption key generated by the information user terminal, an information user ID that is an identifier for uniquely identifying the information user, an information provider ID that is an identifier for uniquely identifying the information provider, and a second information index that indicates an index of first information requested by the information user among information items indicated by a first information index published in the distributed ledger by the information provider, the first transaction data being written in the distributed ledger; generating, by the information provider terminal, first encrypted information by encrypting the first information designated by the second information index by using the encryption key; generating, by the information provider terminal, second transaction data that includes the information provider ID, the information user ID, and the first encrypted information; transmitting, by the information provider terminal, the second transaction data to the one or more authentication server devices; and updating, by the one or more authentication server devices, the distributed ledger after verifying the second transaction data to write the second transaction data into the distributed ledger.

With this configuration, it is possible to prevent information from being acquired without a history being recorded in the blockchain.

Also, the information transaction method may further include: an information requesting phase performed prior to the information providing phase, the information requesting phase being a phase of transmitting, by the information user, a request for the first information to the information provider via the distributed ledger; and an information decryption phase performed after the information providing phase, the information decryption phase being a phase of decrypting, by the information user, the first encrypted information provided from the information provider via the distributed ledger, wherein the information requesting phase includes: generating, by the information user terminal, the first transaction data; transmitting, by the information user terminal, the first transaction data to the one or more authentication server devices; transmitting, by the one or more authentication server devices, the first transaction data to at least one authentication server device other than the one or more authentication server devices of the plurality of authentication server devices; and updating, by the plurality of authentication server devices, the distributed ledger after verifying the first transaction data to write the first transaction data into the distributed ledger, and the information decryption phase includes: acquiring, by the information user terminal, the second transaction data written in the distributed ledger; and acquiring, by the information user terminal, the first information by decrypting the first encrypted information included in the second transaction data acquired, by using a decryption key generated by the information user terminal together with the encryption key, the decryption key being different from the encryption key.

Also, the acquiring, by the information provider terminal, the first transaction data may include acquiring the first transaction data written in the distributed ledger, based on the information provider ID, and the acquiring, by the information user terminal, the second transaction data may include acquiring the second transaction data written in the distributed ledger, based on the information user ID.

The plurality of authentication server devices may have a transaction data transmission function. The information providing phase may include, in the acquiring, by the information provider terminal, the first transaction data, acquiring, by the information provider terminal, the first transaction data by the one or more authentication server devices transmitting the first transaction data written in the distributed ledger to the information provider terminal based on the information provider ID, and the information decryption phase may include, in the acquiring, by the information user terminal, the second transaction data, acquiring, by the information user terminal, the second transaction data by the one or more authentication server devices transmitting the second transaction data written in the distributed ledger to the information user terminal based on the information user ID.

The first information index may indicate a list of one or more information items that are providable via the distributed ledger among information items owned by the information provider. The information transaction method may further include: an access right setting phase performed prior to the information requesting phase, the access right setting phase being a phase of setting, by the information provider, access rights for the one or more information items included in the list. The access right setting phase may include: generating, by the information provider terminal, third transaction data that includes the first information index, access right information that indicates the access rights set for the one or more information items included in the list, date and time, and a signature of the information provider; transmitting, by the information provider terminal, the third transaction data to the one or more authentication server devices; and updating, by the one or more authentication server devices, the distributed ledger after verifying the third transaction data to write the third transaction data into the distributed ledger and publish the first information index in the distributed ledger.

Also, the information requesting phase may include: determining, by the information user terminal, whether the information user has an access right set in the first information prior to generating the first transaction data; and generating, by the information user terminal, the first transaction data when it is determined that the information user has the access right set in the first information.

Also, the information requesting phase may include: determining, by the one or more authentication server devices, whether the information user has the access right set in the first information upon acquiring the first transaction data; and when it is determined that the information user does not have the access right set in the first information, discarding, by the one or more authentication server devices, the first transaction data acquired, without verifying the first transaction data.

Also, the access right setting phase may include: generating, by the information provider terminal, the third transaction data by further including, in the third transaction data, hash values calculated for the one or more information items included in the list; and updating, by the one or more authentication server devices, the distributed ledger after verifying the third transaction data to write the third transaction data into the distributed ledger and publish the first information index and the hash values in the distributed ledger. The information decryption phase may further include: calculating, by the information user terminal, a first hash value of the first information after acquiring the first information by decrypting the first encrypted information; and comparing, by the information user terminal, the first hash value with a second hash value that corresponds to the first information among the hash values published in the distributed ledger.

Also, the information decryption phase may further include: again generating, by the information user terminal, the first transaction data when it is determined from the comparison between the first hash value and the second hash value that the first hash value is different from the second hash value; transmitting, by the information user terminal, the first transaction data generated again to the one or more authentication server devices; transmitting, by the one or more authentication server devices, the first transaction data to the at least one authentication server device other than the one or more authentication server devices of the plurality of authentication server devices; and updating, by the plurality of authentication server devices, the distributed ledger after verifying the first transaction data to write the first transaction data into the distributed ledger.

Also, the information decryption phase may further include: paying, by the information user, a fee to the information provider when the first information is acquired.

Also, the paying the fee may include paying, by the information user, when the first information is acquired a predetermined number of times, the fee for the first information acquired the predetermined number of times to the information provider.

Also, the information decryption phase may further include: paying, by the information user, a fee to the information provider every predetermined period, the fee being for the first information acquired during the predetermined period.

Also, the paying the fee may include paying, by the information user, the fee to the information provider by using a smart contract written in the distributed ledger.

Also, the system may further include an information transaction auditing device that audits an information transaction. The information transaction method may further include: a transaction auditing phase of auditing, by the information transaction auditing device, an anomaly in transactions written in the distributed ledger. The transaction auditing phase may include: checking, by the information transaction auditing device, the distributed ledger to determine, for each of the transactions written in the distributed ledger, whether the transaction has an anomaly; and transmitting, by the information transaction auditing device, to at least one of the information provider or the information user involved in a first transaction determined as having an anomaly among the transactions written in the distributed ledger, a notification informing that the first transaction has an anomaly.

Also, the system may further include an information transaction auditing device that audits an information transaction. The information transaction method may further include: a transaction auditing phase of auditing, by the information transaction auditing device, an anomaly in transactions written in the distributed ledger. The transaction auditing phase may include: checking, by the information transaction auditing device, the distributed ledger to determine, for each of the transactions written in the distributed ledger, whether the transaction has an anomaly; generating, by the information transaction auditing device, fourth transaction data that includes information regarding a first transaction determined as having an anomaly among the transactions written in the distributed ledger; transmitting, by the information transaction auditing device, the fourth transaction data to the one or more authentication server devices; updating, by the one or more authentication server devices, the distributed ledger after verifying the fourth transaction data to write the fourth transaction data into the distributed ledger; and acquiring, by at least one of the information provider or the information user involved in the first transaction, the fourth transaction data written in the distributed ledger and being informed that the first transaction has an anomaly.

Also, the transaction auditing phase may include: generating, by the information transaction auditing device, fifth transaction data that includes information regarding a second transaction determined as having no anomaly among the transactions written in the distributed ledger; transmitting, by the information transaction auditing device, the fifth transaction data to the one or more authentication server devices; updating, by the one or more authentication server devices, the distributed ledger after verifying the fifth transaction data to write the fifth transaction data into the distributed ledger; and acquiring, by at least one of the information provider or the information user involved in the second transaction, the fifth transaction data written in the distributed ledger and being informed that the second transaction has no anomaly.

Also, an information transaction method according to an aspect of the present disclosure is an information transaction method for a system including one or more information provider terminals used by one or more information providers, one or more information user terminals used by one or more information users, and a plurality of authentication server devices that are communicable with the one or more information provider terminals and the one or more information user terminals via a network, wherein encrypted information items and encrypted information IDs are written in a distributed ledger of the plurality of authentication server devices, the encrypted information items being obtained by encrypting one or more information items owned by the one or more information providers by using encryption keys generated by the one or more information user terminals, and the encrypted information IDs being IDs for uniquely identifying the encrypted information items, the information transaction method including: acquiring, by an information provider terminal that is one of the one or more information provider terminals, first transaction data that includes a first information user ID that is an identifier for uniquely identifying a first information user, an information provider ID that is an identifier for uniquely identifying an information provider who is one of the one or more information providers, and a second information index that indicates an index of first information requested by the first information user among information items indicated by a first information index published in the distributed ledger by the information provider, the first transaction data being written in the distributed ledger; generating, by the information provider terminal, second transaction data that includes an encrypted information ID, the information provider ID, and the first information user ID, the encrypted information ID being an ID for identifying first encrypted information encrypted by using an encryption key generated by the information user terminal of the first information user among one or more encrypted information items corresponding to the first information designated by the second information index; transmitting, by the information provider terminal, the second transaction data to the plurality of authentication server devices; and updating, by the plurality of authentication server devices, the distributed ledger after verifying the second transaction data to write the second transaction data into the distributed ledger.

Also, an information user terminal according to an aspect of the present disclosure is an information user terminal for a system including an information provider terminal used by an information provider, the information user terminal used by an information user, and a plurality of authentication server devices that are communicable with the information provider terminal and the information user terminal via a network, the information user terminal including: a communicator that acquires first transaction data that includes an encryption key generated by the information user terminal, an information user ID that is an identifier for uniquely identifying the information user, an information provider ID that is an identifier for uniquely identifying the information provider, and a second information index that indicates an index of first information requested by the information user among information items indicated by a first information index published in a distributed ledger of the plurality of authentication server devices by the information provider, the first transaction data being written in the distributed ledger; an information encrypter that generates first encrypted information by encrypting the first information designated by the second information index by using the encryption key; and a transaction data generator that generates second transaction data that includes the information provider ID, the information user ID, and the first encrypted information. The communicator transmits the second transaction data to one or more authentication server devices of the plurality of authentication server devices to cause the one or more authentication server devices to write the second transaction data into the distributed ledger.

Hereinafter, an embodiment will be described with reference to the drawings. The embodiment described below shows a specific example of the present disclosure. That is, the numerical values, shapes, structural elements, the arrangement and connection of the structural elements, steps, the order of the steps, and the like shown in the following embodiment are merely examples, and therefore are not intended to limit the scope of the present disclosure. The present disclosure is defined based on the appended claims. Accordingly, among the structural elements described in the following embodiment, structural elements not recited in any one of the independent claims are described as structural elements that are not necessarily required to address the problem of the present disclosure, but constitute a preferred embodiment. In addition, the diagrams used below are not necessarily true to scale. In the diagrams, structural elements that have substantially the same configuration are given the same reference numerals, and a redundant description may be omitted or simplified.

Embodiment

Hereinafter, an information transaction system according to the present embodiment will be described with reference to the drawings, 1. Configuration of Information Transaction System In an information transaction system according to the present disclosure, an information provider acquires, via a distributed ledger, an index of information requested by an information user and an encryption key provided from the information user. Then, the information provider provides encrypted information to the information user via the distributed ledger, the encrypted information being the information requested by the information user that has been encrypted by using the acquired encryption key. With this configuration, it is possible to prevent the information user from acquiring the information provided by the information provider without a history being recorded in the blockchain.

1.1 Overall Configuration of Information Transaction Method

FIG. 1 is a diagram schematically showing an overall configuration of an information transaction system according to the present embodiment.

As shown in FIG. 1, the information transaction system according to the present embodiment includes information provider terminal 100, information user terminal 200, three authentication server devices 300, 310, and 320, and information transaction auditing device 400. These are communicably connected to each other. The communication therebetween may be performed through any one of a wired Internet line, wireless communication, dedicated communication, and the like. Also, the communication performed therebetween does not necessarily need to be real-time communication. For example, information user terminal 200 may accumulate a certain amount of transaction data, and transmit the accumulated transaction data to the plurality of authentication server devices 300, 310, and 320 at a time.

FIG. 1 shows an example in which the information transaction system according to the present embodiment includes one information provider terminal 100, one information user terminal 200, and three authentication server devices 300, but the present embodiment is not limited thereto. That is, the information transaction system according to the present embodiment may include two or more information provider terminals 100, and may include two or more information user terminals 200. Also, the information transaction system according to the present embodiment may include one or more authentication server devices 300, and may include four or more authentication server devices 300.

1.2 Information Provider Terminal 100

Information provider terminal 100 is a terminal that is used by an information provider to provide information owned by the information provider via a blockchain. The information provider may be, for example, an individual, or an organization such as a company. Information provider terminal 100 may be, for example, a personal computer, or may be a portable terminal such as a smartphone or a tablet. Information provider terminal 100 provides encrypted information to the information user via the distributed ledger, the encrypted information being obtained by encrypting information requested by the information user by using an encryption key provided from the information user via the distributed ledger.

Figure 2:
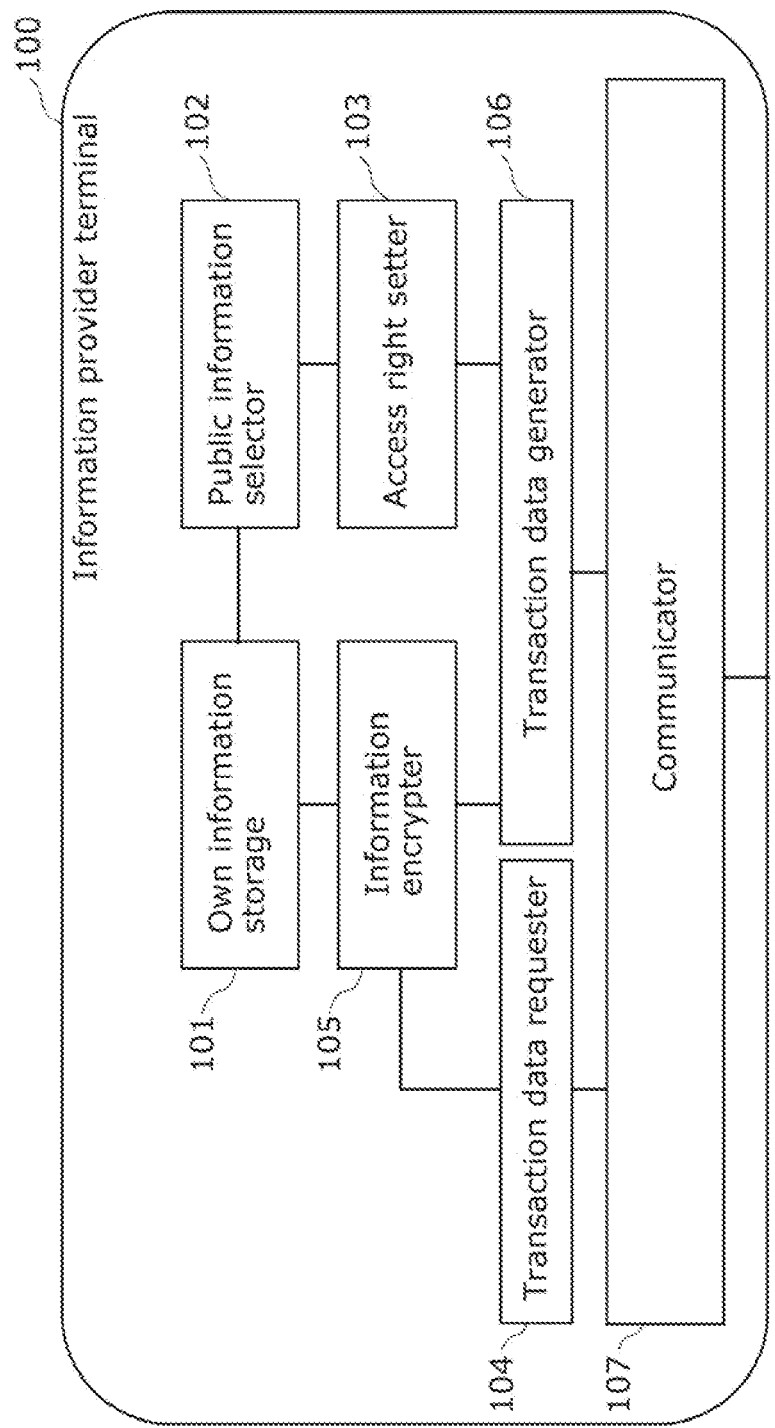
FIG. 2 is a diagram showing an example of a functional configuration of an information provider terminal according to the embodiment.

FIG. 2 is a diagram showing an example of a functional configuration of information provider terminal 100 according to the present embodiment.

Information provider terminal 100 includes a processor, a memory in which a predetermined program for causing the processor to execute predetermined processing operations is stored, a communication interface, and the like. That is, information provider terminal 100 is implemented by the processor executing the predetermined program using the memory.

As shown in FIG. 2, in the present embodiment, information provider terminal 100 includes own information storage 101, public information selector 102, access right setter 103, transaction data requester 104, information encrypter 105, transaction data generator 106, and communicator 107. The above-described structural elements will be described below one by one.

1.2.1 Own Information Storage 101

Own information storage 101 stores information owned by the information provider. The information owned by the information provider may include, for example, name, date of birth, address, hobby, purchase history, web browsing history of the information provider, information obtained from a biosensor, and the like, in the case where the information provider is an individual.

1.2.2 Public Information Selector 102

Public information selector 102 selects one or more information items that are providable via the distributed ledger from among the information items owned by the information provider. In the present embodiment, public information selector 102 includes an interface for receiving an input from the information provider. Public information selector 102 displays, for example, a list (also referred to as "index") of a plurality of information items stored in own information storage 101 by using the interface, and selects one or more information items that are allowed for publication via the blockchain. Public information selector 102 creates a publishable first information index that indicates a list of the selected one or more information items. The first information index includes the name of each of one or more information items and the ID of the same.

1.2.3 Access Right Setter 103

Access right setter 103 sets an access right for each of the one or more information items included in the first information index (the list of the one or more information items) that are allowed for publication via the blockchain.

In the present embodiment, access right setter 103 sets, for each of the one or more information items indicated by the first information index selected by public information selector 102, an access right that indicates information users who can access the information.

The access right may be set for each information user, or may be set for each attribute of information user. As used herein, the term "attribute of information user" refers to, for example, workplace, nationality, gender, age, or the like of information user. The access right may be set for each of the one or more information items indicated by the first information index, or may set for each classification into which the one or more information items are classified in advance. Also, the access right may be set collectively for all of the one or more information items indicated by the first information index.

Access right setter 103 transmits, to transaction data generator 106, the first information index selected by public information selector 102 and access right information that indicates the access rights set for the one or more information items indicated by the first information index.

1.2.4 Transaction Data Requester 104

Transaction data requester 104 transmits, to at least one of authentication server devices 300, 310, and 320 via communicator 107, a request for transaction data registered in the blockchain, or in other words, written in the distributed ledger.

Here, the transaction data requested by transaction data requester 104 may be all transaction data items recorded in the distributed ledger, or may be new transaction data newly recorded after the previous request. Also, the transaction data requested by transaction data requester 104 may be transaction data related to information provider terminal 100 such as transaction data that indicates a request for the information items indicated by the published first information index.

When transaction data requester 104 acquires the transaction data that indicates a request for information related to information provider terminal 100 (hereinafter referred to as "first transaction data") via communicator 107, transaction data requester 104 transmits the acquired first transaction data to information encrypter 105. In the present embodiment, the acquired first transaction data includes an encryption key generated by information user terminal 200, an information user ID, an information provider ID, and a second information index that indicates an index of first information requested by the information user selected from among the information items indicated by the first information index published in the distributed ledger. The information user ID is an identifier for uniquely identifying the information user, and the information provider ID is an identifier for uniquely identifying the information provider.

Transaction data requester 104 may acquire the first transaction data based on the information provider ID. More specifically, transaction data requester 104 can acquire the first transaction data by identifying the first transaction data that includes the information provider ID from among a plurality of transaction data items written in the distributed ledger.

Also, transaction data requester 104 may transmit a request for the first transaction data that includes the information provider ID to at least one of authentication server devices 300, 310, and 320 via communicator 107. With this configuration, as long as the first transaction data is written in the distributed ledger, at least one of authentication server devices 300, 310, and 320 can transmit the first transaction data to transaction data requester 104. Accordingly, transaction data requester 104 can acquire the first transaction data.

1.2.5 Information Encrypter 105

Information encrypter 105 generates first encrypted information by encrypting the first information designated by the second information index included in the first transaction data by using the encryption key included in the first transaction data.

In the present embodiment, information encrypter 105 references to the second information index included in the first transaction data transmitted from transaction data requester 104, and acquires the first information requested by the information user from own information storage 101. Information encrypter 105 generates first encrypted information by encrypting the acquired first information by using the encryption key included in the first transaction data transmitted from transaction data requester 104. Information encrypter 105 transmits the generated first encrypted information to transaction data generator 106.

1.2.6 Transaction Data Generator 106

Transaction data generator 106 generates transaction data (hereinafter referred to as "third transaction data") that includes the first information index and the access right information transmitted from access right setter 103. More specifically, transaction data generator 106 generates third transaction data that includes the first information index, the access right information that indicates the access rights set for each of one or more information items included in the list indicated by the first information index, date and time, and a signature of the information provider.

FIGS. 3A and 3B are diagrams conceptually showing examples of data structures of the third transaction data according to the present embodiment. FIG. 3A shows an example of the third transaction data that includes the information provider ID, the first information index, the access right information, and the signature of the information provider. Specifically, FIG. 3A shows an example of a data structure of the third transaction data for allowing the information provider with an information provider ID of P001 to provide the information items of the information provider with an information provider ID of P001 indicated by the first information index such as age, gender, and purchase history via the blockchain (distributed ledger).

More specifically, FIG. 3A shows an example in which an access right to age, an access right to gender, and an access right to purchase history are set for each information user as the access right information. In the example shown in FIG. 3A, the access right to age is set to allow only information users with information user IDs of U001, U002, and 0003 to access. Likewise, the access right to gender is set to allow only the information user with an information user ID of U002 to access, and the access right to purchase history is set to allow only the information user with an information user ID of U001 to access. FIG. 3B shows an example of the third transaction data in which the access rights indicated by the access right information are set using information user attributes. Other than this, FIG. 3B is the same as FIG. 3A.

Also, transaction data generator 106 generates transaction data (hereinafter referred to as "second transaction data") that includes the first encrypted information transmitted from information encrypter 105. More specifically, transaction data generator 106 generates second transaction data that includes the information provider ID, the information user ID, and the first encrypted information.

FIG. 4 is a diagram conceptually showing an example of a data structure of the second transaction data according to the present embodiment. FIG. 4 shows an example of the second transaction data that includes the information user ID, the information provider ID, the provided information, and the signature of the information provider. Specifically, FIG. 4 shows an example of a data structure of the second transaction data for allowing the information provider with an information provider ID of P001 to provide information using the first encrypted information to the information user with an information user ID of U001 via the blockchain (distributed ledger). More specifically, FIG. 4 shows an example in which, as the provided information included in the second transaction data, the age information and the purchase history information are encrypted.

When transaction data generator 106 generates the first transaction data or the second transaction data, transaction data generator 106 transmits the generated transaction data to at least one of authentication server devices 300, 310, and 320 via communicator 107.

1.2.7 Communicator 107

Communicator 107 transmits the second transaction data or the third transaction data generated by transaction data generator 106 to one or more authentication servers.

In the present embodiment, communicator 107 transmits the transaction data generated by transaction data generator 106 to one or more of authentication server devices 300, 310, and 320. Also, communicator 107 transmits a request for transaction data to at least one of authentication server devices 300, 310, and 320 in accordance with a request from transaction data requester 104, and transmits the acquired transaction data to transaction data requester 104.

1.3 Information User Terminal 200

Next, a description of information user terminal 200 will be given.

Information user terminal 200 is a terminal that is used by the information user to acquire information that the information user wants to use from among the information items indicated by the first information index published by the information provider via the blockchain. The information user may be, for example, an individual, or an organization such as a company. Information user terminal 200 may be, for example, a personal computer, or may be a portable terminal such as a smartphone or a tablet.

Information user terminal 200 selects information that the information user wants to use from among the information items indicated by the first information index published by the information provider via the blockchain, transmits a request for the selected information to the information provider via the blockchain, and provides a generated encryption key. Information user terminal 200 decrypts encrypted requested information that was provided by the information provider via the blockchain, and acquires the requested information.

Figure 5:
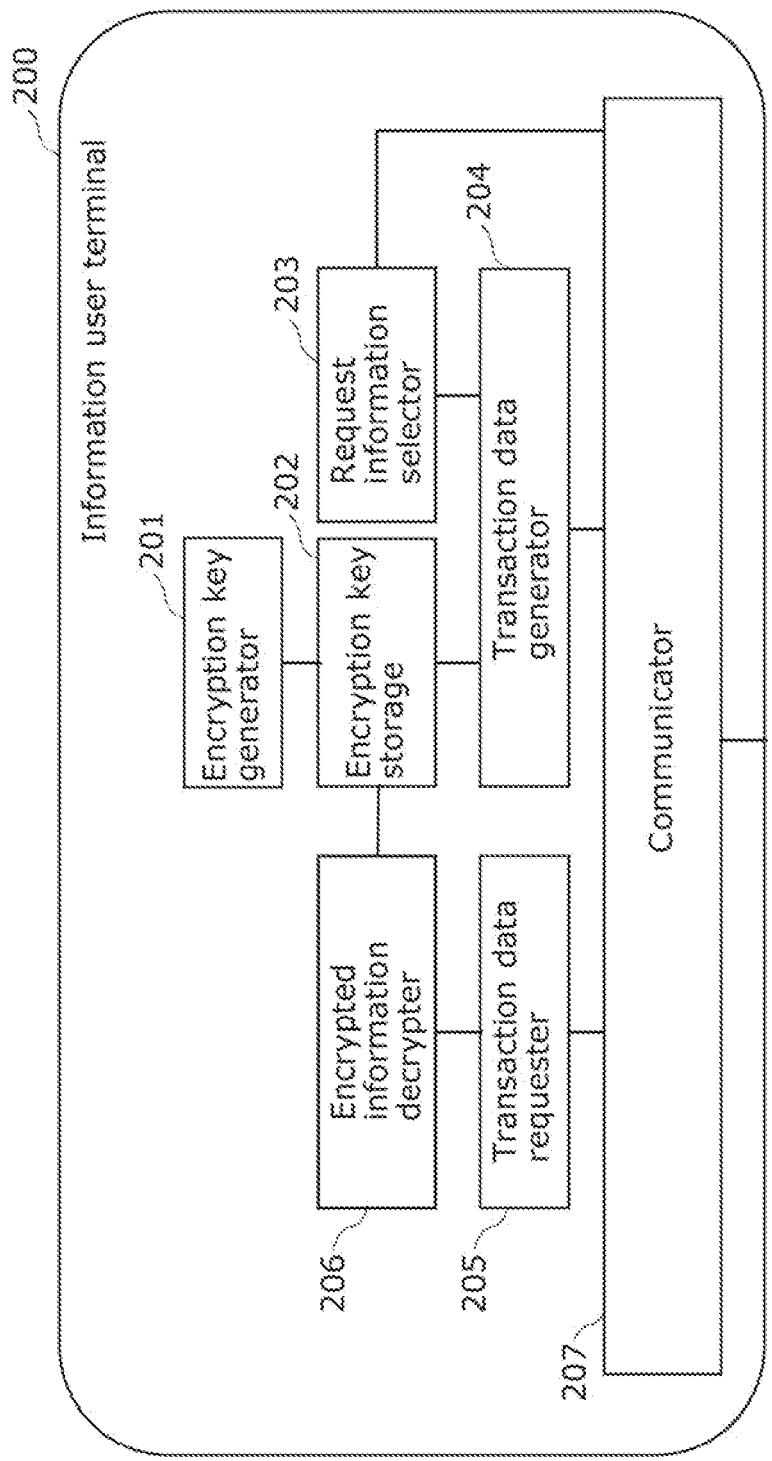
FIG. 5 is a diagram showing an example of a functional configuration of an information user terminal according to the embodiment.

FIG. 5 is a diagram showing an example of a functional configuration of information user terminal 200 according to the present embodiment.

Information user terminal 200 includes a processor, a memory in which a predetermined program for causing the processor to execute predetermined processing operations is stored, a communication interface, and the like. That is, information user terminal 200 is implemented by the processor executing the predetermined program using the memory.

As shown in FIG. 5, in the present embodiment, information user terminal 200 includes encryption key generator 201, encryption key storage 202, request information selector 203, transaction data generator 204, transaction data requester 205, encrypted information decrypter 206, and communicator 207. The above-described structural elements will be described below one by one.

1.3.1 Encryption Key Generator 201

Encryption key generator 201 generates an encryption key that is used to receive and transmit the information requested by the information user, and transmits the generated encryption key to encryption key storage 202.

Here, the encryption key generated by encryption key generator 201 may include, for example, a public key and a private key, but the configuration is not limited thereto. It is sufficient that the encryption key generated by encryption key generator 201 includes an encryption key for encryption and an encryption key for decryption (hereinafter referred to as "encryption key" and "decryption key", respectively) that are different from each other.

The public key and the private key may be generated by using, for example, the RSA cryptosystem disclosed in NPL 2, or the elliptic Elgamal cryptosystem disclosed in NPL 3. The public key may be generated only once when the information user activates information user terminal 200, and after that, only the generated public key may be used. Alternatively, the public key may be generated each time transaction data generator 204 generates transaction data.

1.3.2 Encryption Key Storage 202

Encryption key storage 202 stores, for example, the encryption key and the decryption key generated by encryption key generator 201 such as the public key and the private key.

When transaction data generator 204 generates transaction data (or in other words, first transaction data) that requests the information provider for information, encryption key storage 202 transmits the encryption key such as the public key to transaction data generator 204. When encrypted information decrypter 206 decrypts the first encrypted information, encryption key storage 202 transmits the decryption key such as the private key to encrypted information decrypter 206.

1.3.3 Request Information Selector 203

Request information selector 203 selects an index of first information requested for the information user to use, or in other words, a second information index from among the information items indicated by the first information index published in the distributed ledger by the information provider. In the present embodiment, request information selector 203 may include an interface that receives an input from the information user. Request information selector 203 displays, by using the interface, for example, a list of information items published in the distributed ledger by the information provider, or in other words, the first information index. Then, the information user selects an index of one or more information items that the information user wants to use, or in other words, the second information index, from among the information items indicted by the first information index.

Request information selector 203 acquires the first information index published in the distributed ledger by the information provider from the blockchain, or in other words, the distributed ledger. More specifically, request information selector 203 can acquire the first information index by transmitting a request for transaction data that includes the first information index written in the distributed ledger to at least one of authentication server devices 300, 310, and 320 via communicator 207.

Request information selector 203 transmits the selected second information index to transaction data generator 204.

1.3.4 Transaction Data Generator 204

Transaction data generator 204 generates transaction data (or in other words, first transaction data) that includes the second information index transmitted from request information selector 203 and the encryption key (for example, public key) transmitted from encryption key storage 202. More specifically, transaction data generator 204 generates first transaction data that includes the encryption key such as the public key, the information user ID, the information provider ID, and the second information index that indicates an index of first information requested by the information user selected from among the information items indicated by the first information index published in the distributed ledger. Here, the second information index is a list of one or more information items that the information user wants to use, and includes the name of each of the one or more information items and the ID of the same.

FIG. 6 is a diagram conceptually showing an example of a data structure of the first transaction data according to the present embodiment. FIG. 6 shows an example of the first transaction data that includes the information user ID, the information provider ID, the request information, the encryption key, and the signature of the information user. Specifically, FIG. 6 shows an example of a data structure of the first transaction data that includes request information and an encryption key, the request information being information indicating a request for information that the information user wants to use via the distributed ledger, transmitted by the information user with an information user ID of U001 to the information provider with an information provider ID of P001. More specifically, FIG. 6 shows an example in which the request information included in the first transaction data includes age information and purchase history information.

When transaction data generator 204 generates the first transaction data, transaction data generator 204 transmits the generated first transaction data to at least one of authentication server devices 300, 310, and 320 via communicator 207.

1.3.5 Transaction Data Requester 205

Transaction data requester 205 acquires the second transaction data written in the distributed ledger from at least one of authentication server devices 300, 310, and 320 via communicator 207.

Here, transaction data requester 205 may transmit a request for the second transaction data that includes the information user ID and the first encrypted information generated by the information provider to at least one of authentication server devices 300, 310, and 320 via communicator 207. With this configuration, as long as the second transaction data is written in the distributed ledger, at least one of authentication server devices 300, 310, and 320 can transmit the second transaction data to transaction data requester 205. Accordingly, transaction data requester 205 can acquire the second transaction data.

Also, transaction data requester 205 may acquire the second transaction data based on the information provider ID. More specifically, transaction data requester 205 may acquire the second transaction data by identifying the second transaction data that includes the information user ID and the first encrypted information generated by the information provider from among the plurality of transaction data items written in the distributed ledger.

When transaction data requester 205 acquires the second transaction data written in the distributed ledger, transaction data requester 205 transmits the first encrypted information included in the second transaction data to encrypted information decrypter 206.

1.3.6 Encrypted Information Decrypter 206

Encrypted information decrypter 206 acquires the first information by decrypting the encrypted information included in the second transaction data by using the decryption key that was generated by encryption key generator 201 together with the encryption key and is different from the encryption key. As described above, the decryption key may be a private key, and is stored in encryption key storage 202. That is, encrypted information decrypter 206 may decrypt the encrypted information included in the second transaction data by using the private key stored in encryption key storage 202.

1.3.7 Communicator 207

Communicator 207 transmits the first transaction data generated by transaction data generator 204 to one or more authentication servers. In the present embodiment, communicator 207 transmits the first transaction data generated by transaction data generator 204 to one or more of authentication server devices 300, 310, and 320, and information provider terminal 100.

Also, communicator 207 transmits a request for the second transaction data or the latest distributed ledger to at least one of authentication server devices 300, 310, and 320 in accordance with a request from transaction data requester 205. Communicator 207 transmits, to transaction data requester 205, the second transaction data or the latest distributed ledger acquired from the at least one of authentication server devices 300, 310, and 320.

1.4 Authentication Server Device 300

Next, a description of authentication server device 300 and the like will be given.

As shown in FIG. 1, authentication server devices 300, 310, and 320 are, for example, cloud servers, and are communicable with information provider terminal 100 and information user terminal 200 via a network. In the information transaction system according to the present disclosure, it is sufficient that the information transaction system includes one or more authentication server devices. Authentication server devices 300, 310, and 320 have the same configuration. Accordingly, hereinafter, the following description will be given using authentication server device 300 as an example.

Authentication server device 300 verifies the transaction data acquired from information provider terminal 100 and information user terminal 200, updates the distributed ledger, and thus registers the transaction data in the blockchain. Also, in response to a request, authentication server device 300 transmits the latest ledger or the requested transaction data to information provider terminal 100 and information user terminal 200.

Figure 7:
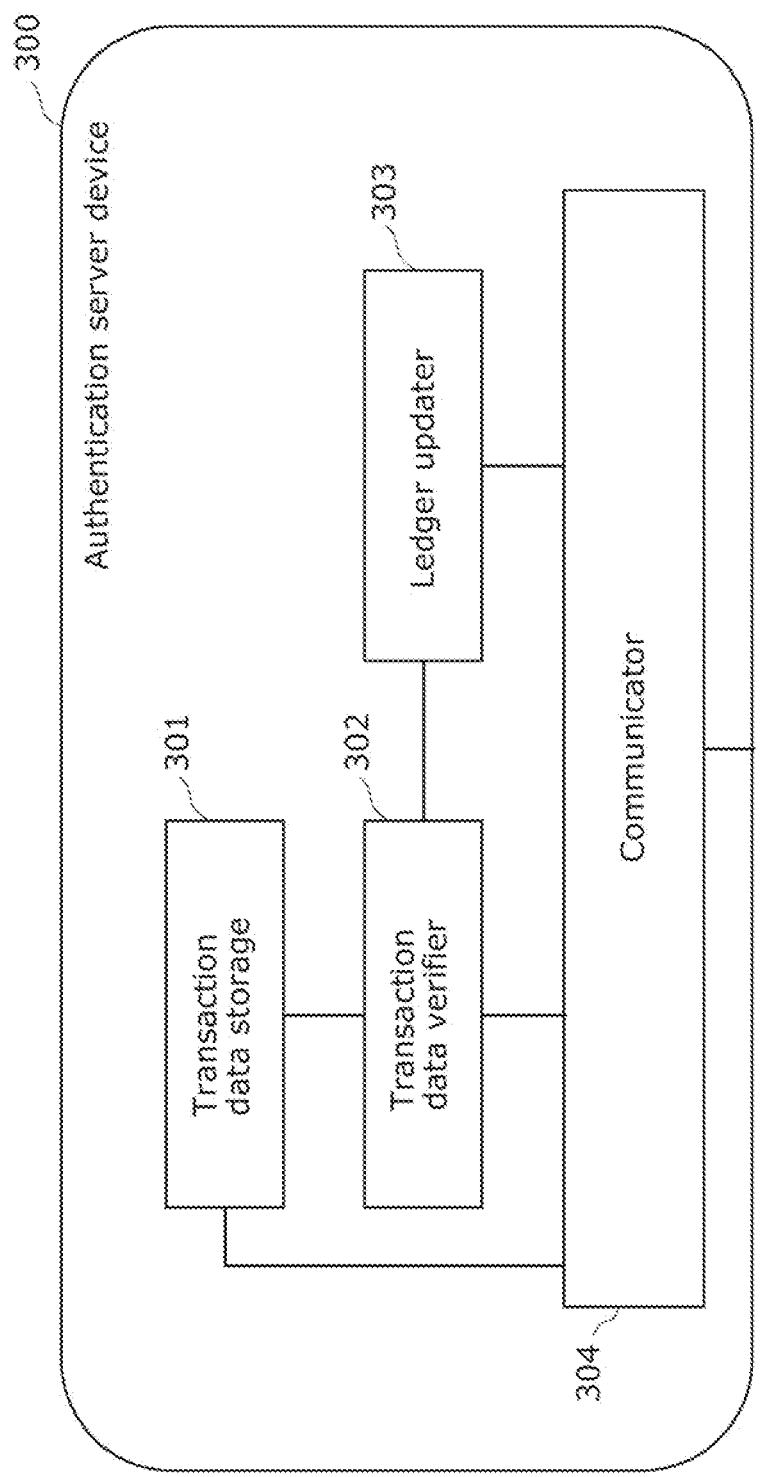
FIG. 7 is a diagram showing an example of a functional configuration of an authentication server device according to the embodiment.

FIG. 7 is a diagram showing an example of a functional configuration of authentication server device 300 according to the present embodiment.

Authentication server device 300 may be implemented by a processor executing a predetermined program using a memory. In the present embodiment, as shown in FIG. 7, authentication server device 300 includes transaction data storage 301, transaction data verifier 302, ledger updater 303, and communicator 304. The above-described structural elements will be described below one by one,

1.4.1 Transaction Data Storage 301

Transaction data storage 301 functions as a transaction pool that stores unverified transaction data included in the blockchain.

In the present embodiment, transaction data storage 301 stores and temporarily maintains the second transaction data or the third transaction data acquired from information provider terminal 100. Also, transaction data storage 301 stores the first transaction data acquired from information user terminal 200.

1.4.2 Transaction Data Verifier 302

Transaction data verifier 302 verifies the validity of the transaction data acquired from information provider terminal 100 or information user terminal 200. For example, transaction data verifier 302 performs verification by determining whether an electronic signature generated by using the right method is attached to the acquired transaction data, whether necessary information is written in the acquired transaction data, or the like. As used herein, the term "necessary information" refers to, for example, when the third transaction data that includes the access right information is acquired from information provider terminal 100, information in which access right is set for which information item is correctly written.

If the verification of the validity of the transaction data is successful, transaction data verifier 302 transmits the result to other authentication server devices 310 and 320. This verification step may be skipped.

Also, transaction data verifier 302 executes, together with other authentication server devices, a consensus algorithm for determining the validity of the transaction data.

As described above, transaction data verifier 302 executes the consensus algorithm together with the plurality of authentication server devices.

Here, as the consensus algorithm, PBFT (Practical Byzantine Fault Tolerance) may be used, or any other known consensus algorithm may be used. As the consensus algorithm, for example, PoW (Proof of Work), PoS (Proof of Stake), or the like may be used. In the case where PBFT is used as the consensus algorithm, transaction data verifier 302 may receive a report indicating whether the verification of the transaction data is successful or not from each of the other plurality of authentication server devices 310 and 320, and determine whether the number of reports has exceeded a predetermined number. If it is determined that the number of reports has exceeded the predetermined number, transaction data verifier 302 may determine that the validity of the transaction has been verified by the consensus algorithm.

1.4.3 Ledger Updater 303

Ledger updater 303 writes the transaction data into the distributed ledger by updating the distributed ledger after the transaction data has been verified by transaction data verifier 302.

In the present embodiment, ledger updater 303 is a processor that stores the transaction data verified as valid by transaction data verifier 302 in the distributed ledger. Ledger updater 303 generates a block that includes the transaction data verified as valid by transaction data verifier 302, and stores (writes) the generated block into the distributed ledger by updating the distributed ledger. In other words, ledger updater 303 generates a block that includes the transaction data whose validity has been verified by transaction data verifier 302, and registers the generated block in the blockchain stored in the distributed ledger by connecting to the blockchain.

Also, ledger updater 303 transmits the latest ledger or the requested transaction data to information provider terminal 100 or information user terminal 200 in response to a request from the information provider or the information user.

Here, a data structure of a blockchain will be described.

Figure 8:
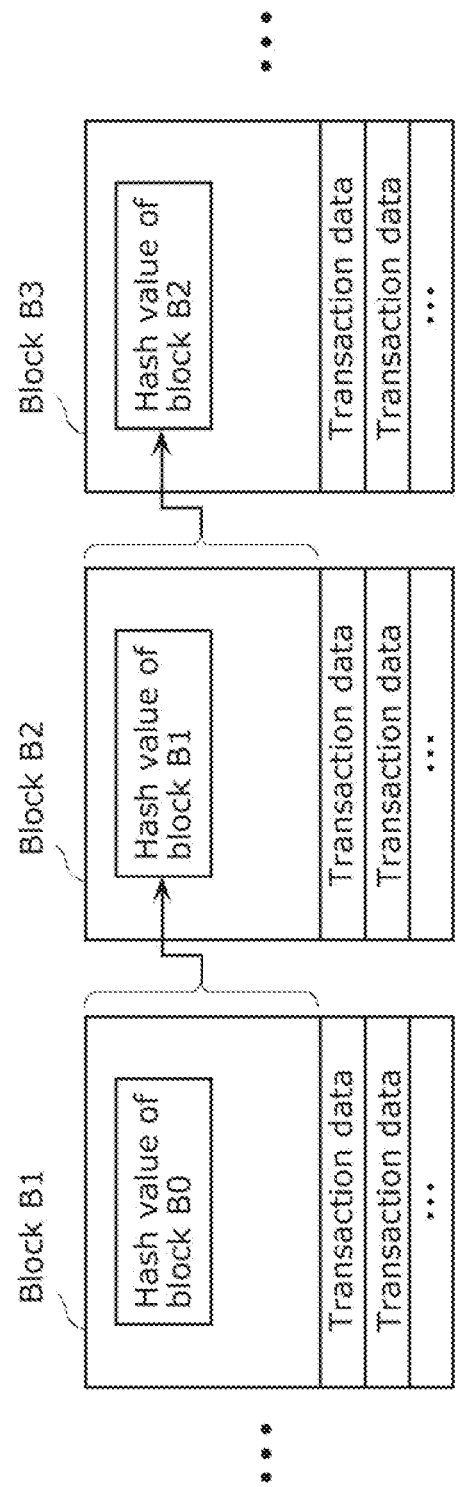
FIG. 8 is an illustrative diagram showing a data structure of a blockchain.

FIG. 8 is an illustrative diagram showing the data structure of a blockchain.

The blockchain has a structure in which blocks, each of which is a recording unit, are connected in the form of a chain. Each of the blocks includes a plurality of transaction data items and the hash value of the immediately preceding block. Specifically, block B2 includes the hash value of block B1 that is the immediately preceding block. Then, a hash value calculated from the plurality of transaction data items that are included in block B2 and the hash value of block B1 is included in block B3 as the hash value of block B2. In this way, blocks are connected in the form of a chain, with each block including the content of the preceding block as a hash value, whereby tampering of the connected transaction data can be effectively prevented.

If a change is made to past transaction data, the hash value of the block takes a value different from the value before the change was made. In order to make the tampered block to appear to be valid, all of the blocks after the tampered block must be reconstructed, and this operation is practically very difficult to perform.

1.4.4 Communicator 304

Communicator 304 performs communication with other authentication server devices 310 and 320, and also performs communication with information provider terminal 100 or information user terminal 200.

In the present embodiment, when communicator 304 acquires transaction data from, for example, information provider terminal 100 or information user terminal 200, communicator 304 transmits the acquired transaction data to transaction data storage 301. Also, for example, when a request for the latest ledger or transaction data has been received from the information provider or the information user, communicator 304 obtains the latest ledger or the requested transaction data from ledger updater 303, and transmits the obtained data to information provider terminal 100 or information user terminal 200.

For example, when a request for first transaction data has been received from information provider terminal 100, communicator 304 may transmit the first transaction data identified based on the information provider ID and written in the distributed ledger to information provider terminal 100. Also, when a request for second transaction data has been received from information user terminal 200, communicator 304 may transmit the second transaction data identified based on the information user ID and written in the distributed ledger to information user terminal 200.

1.5 Information Transaction Auditing Device 400

Next, a description of information transaction auditing device 400 will be given.

As shown in FIG. 1, information transaction auditing device 400 is a device independent of information provider terminal 100 and information user terminal 200. Information transaction auditing device 400 may also function as an authentication server.

Information transaction auditing device 400 audits an anomaly in the transactions written in the distributed ledger. More specifically, information transaction auditing device 400 monitors whether each information transaction is appropriately performed by monitoring the distributed ledger shared by authentication server device 300 and the like.

Figure 9:
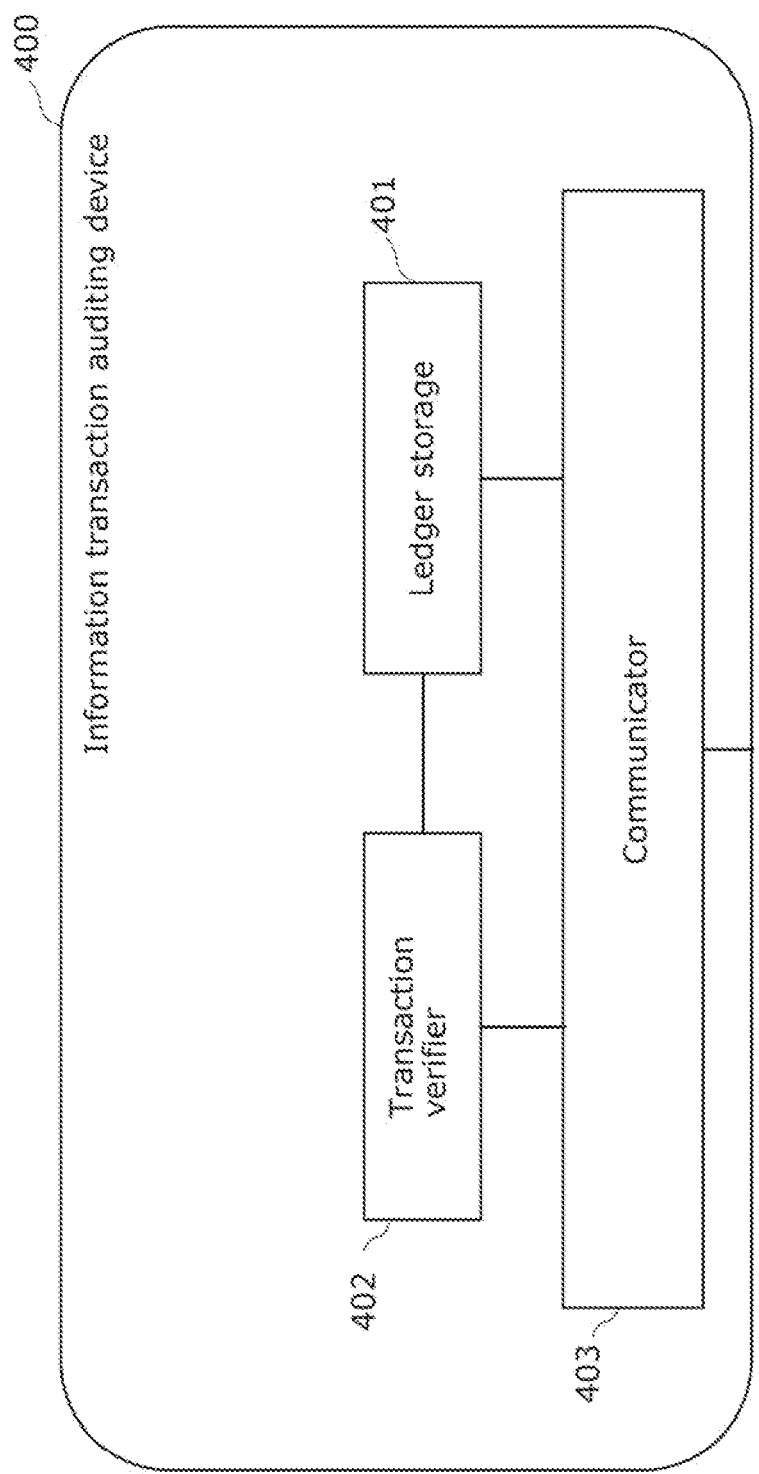
FIG. 9 is a diagram showing an example of a function& configuration of an information transaction auditing device according to the embodiment.

FIG. 9 is a diagram showing an example of a functional configuration of information transaction auditing device 400 according to the present embodiment.

Information transaction auditing device 400 may be implemented by a processor executing a predetermined program using a memory. In the present embodiment, as shown in FIG. 9, information transaction auditing device 400 includes ledger storage 401, transaction verifier 402, and communicator 403. The above-described structural elements will be described below one by one.

1.5.1 Ledger Storage 401

Ledger storage 401 acquires the latest distributed ledger (also referred to as "latest ledger") from at least one of authentication server devices 300, 310, and 320, and stores the latest distributed ledger into a storage device. In the case where information transaction auditing device 400 also functions as an authentication server device, the function of ledger updater 303 of authentication server device 300 may be used as the function of ledger storage 401.

1.5.2 Transaction Verifier 402

Transaction verifier 402 checks the distributed ledger stored in ledger storage 401 to determine, for each of the transactions written in the distributed ledger, whether the transaction has an anomaly.

In the present embodiment, transaction verifier 402 checks the distributed ledgers stored in ledger storage 401 including the latest distributed ledger and the past distributed ledger, and determines whether an anomalous transaction has occurred or not.

Here, for example, if it is determined, as a result of transaction verifier 402 checking the distributed ledger, that a response is not received from the information provider for a predetermined period of time or more despite the fact that a request from the information user has been received, transaction verifier 402 may determine that the information transaction is an anomalous transaction. In this way, transaction verifier 402 may determine a transaction that is not completed for a predetermined period of time as an anomalous transaction.

Also, for example, if it is determined, as a result of transaction verifier 402 checking the distributed ledger, that transaction data provided from the information provider is written despite the fact that transaction data that indicates a request for information from the information user is not written, transaction verifier 402 may determine that the information transaction is an anomalous transaction.

The verification method for determining whether an anomalous transaction has occurred based on the distributed ledger and the content of verification are not limited to those described above.

If it is determined that there is an anomalous transaction, transaction verifier 402 may transmit the transaction content of the anomalous transaction to communicator 403, and transmit a notification to the information provider or the information user involved in the transaction. More specifically, transaction verifier 402 may transmit a notification informing that a first transaction has an anomaly, the first transaction being included in all of the transactions written in the distributed ledger, to at least one of the information provider and the information user who are involved in the first transaction determined as having an anomaly.

Even if it is determined that there is no anomalous transaction, transaction verifier 402 may transmit a notification indicating that there is no anomalous transaction to the information provider or the information user involved in the transaction. Also, transaction verifier 402 may generate transaction data that includes anomalous transaction information, and if it is determined that there is an anomalous transaction, transmit the transaction data to authentication server devices 300, 310, and 320.

1.5.3 Communicator 403

Communicator 403 performs communication with authentication server devices 310 and 320, and also performs communication with information provider terminal 100 or information user terminal 200.

In the present embodiment, communicator 403 acquires the distributed ledger from authentication server devices 300, 310, and 320, and stores the distributed ledger in ledger storage 401. Communicator 403 may also obtain a result of verification from transaction verifier 402, and transmit the result of verification to information provider terminal 100 or information user terminal 200.

2. Operation of Information Transaction System

Next, a description will be given of an example of an operation performed by the information transaction system configured as described above. The operation of the information transaction system includes operations in five phases including an access right setting phase, an information requesting phase, an information providing phase, an information decryption phase, and a transaction auditing phase. Hereinafter, a description will be given of the operations performed by the information transaction system in the access right setting phase, the information requesting phase, the information providing phase, and the information decryption phase.

2.1 Access Right Setting Phase

First, an operation performed by the information transaction system in the access right setting phase will be described. In the access right setting phase, an operation is performed in which the information provider sets an access right for each of one or more information items included in the list published in the blockchain, or in other words, the information index. The access right setting phase is performed prior to the information providing phase.

Figure 10:
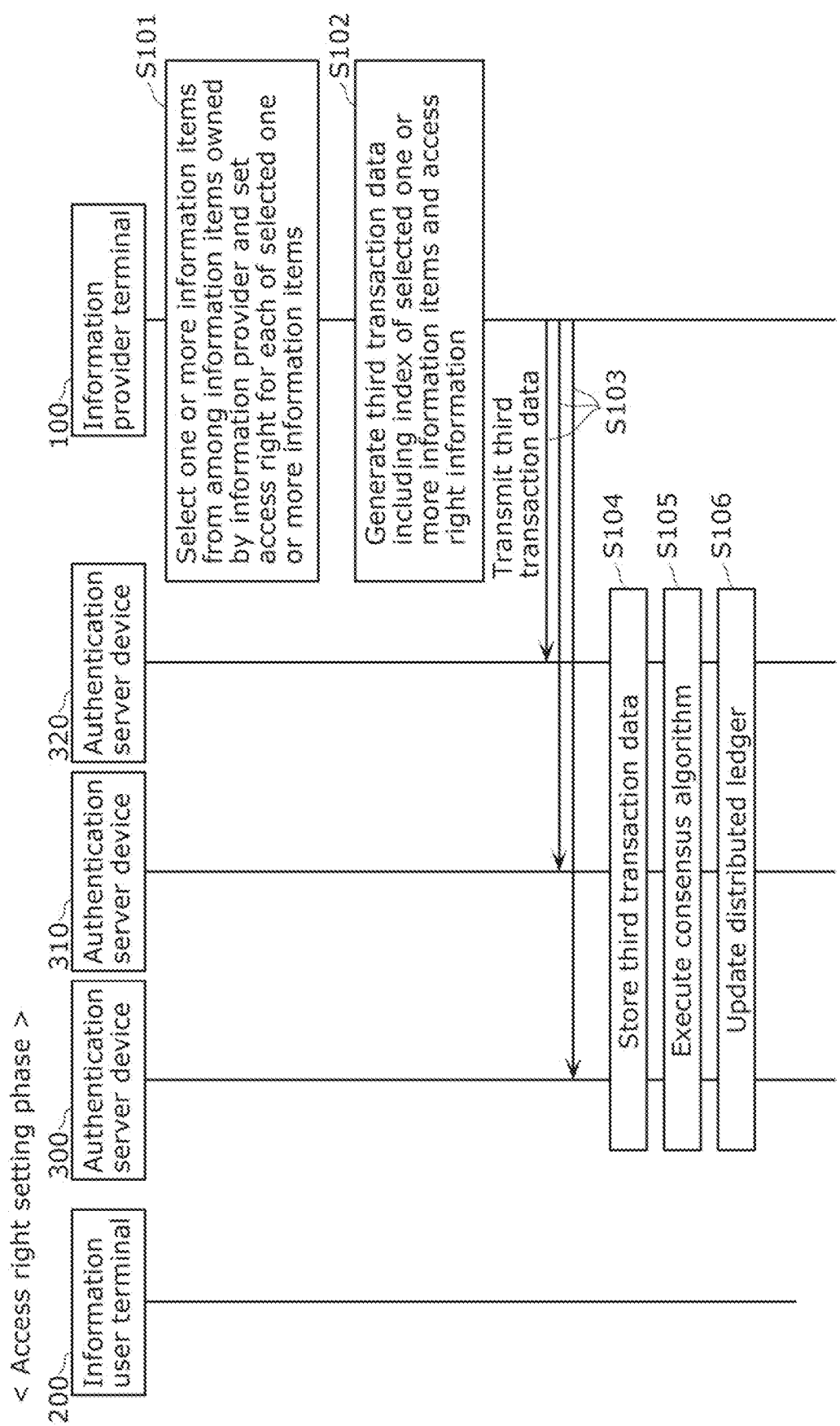
FIG. 10 is a sequence diagram showing an example of an operation performed in an access right setting phase according to the embodiment.

FIG. 10 is a sequence diagram showing an example of the operation performed in the access right setting phase according to the present embodiment.

First, information provider terminal 100 selects one or more information items from among information items owned by the information provider, and sets an access right for each of the selected one or more information items (S101). More specifically, the information provider selects, by using information provider terminal 100, one or more information items that are allowed for transaction via the blockchain from among the information items owned by the information provider. The information provider sets, by using information provider terminal 100, an access right for each of the selected one or more information items.

Next, information provider terminal 100 generates third transaction data that includes an index (or in other words, a first information index) of the one or more information items selected in step S101 and access right information (S102). More specifically, the information provider generates, by using information provider terminal 100, third transaction data that includes first information index that indicates the name and the ID of each of the selected one or more information items and access right information that indicates the access rights set for each of the selected one or more information items.

Next, information provider terminal 100 transmits the third transaction data generated in step S102 to authentication server devices 300, 310, and 320 (S103).

Next, each of authentication server devices 300, 310, and 320 stores the acquired third transaction data (S104).

Next, authentication server devices 300, 310, and 320 execute a consensus algorithm for determining the validity of the third transaction data (S105). After verifying the validity of the third transaction data, each of authentication server devices 300, 310, and 320 generates a block that includes the third transaction data. Here, it is assumed that authentication server devices 300, 310, and 320 operate in accordance with, for example, the method disclosed in NPL 1. In this case, one of authentication server devices 300, 310, and 320 that first generates a block transmits the generated block to the other authentication servers, and the other authentication servers determine whether the block that has been transmitted and acquired is an appropriately generated block.

Next, authentication server devices 300, 310, and 320 update the distributed ledger by writing the block generated as a result of the consensus algorithm being executed in step S105 into the distributed ledger (S106).

2.2 Information Requesting Phase

Next, an operation performed by the information transaction system in the information requesting phase will be described. In the information requesting phase, an operation is performed in which the information provider provides information requested by the information user via the distributed ledger (or in other words, the blockchain) of one or more of the plurality of authentication server devices. The information requesting phase is performed prior to the information providing phase.

Figure 11:
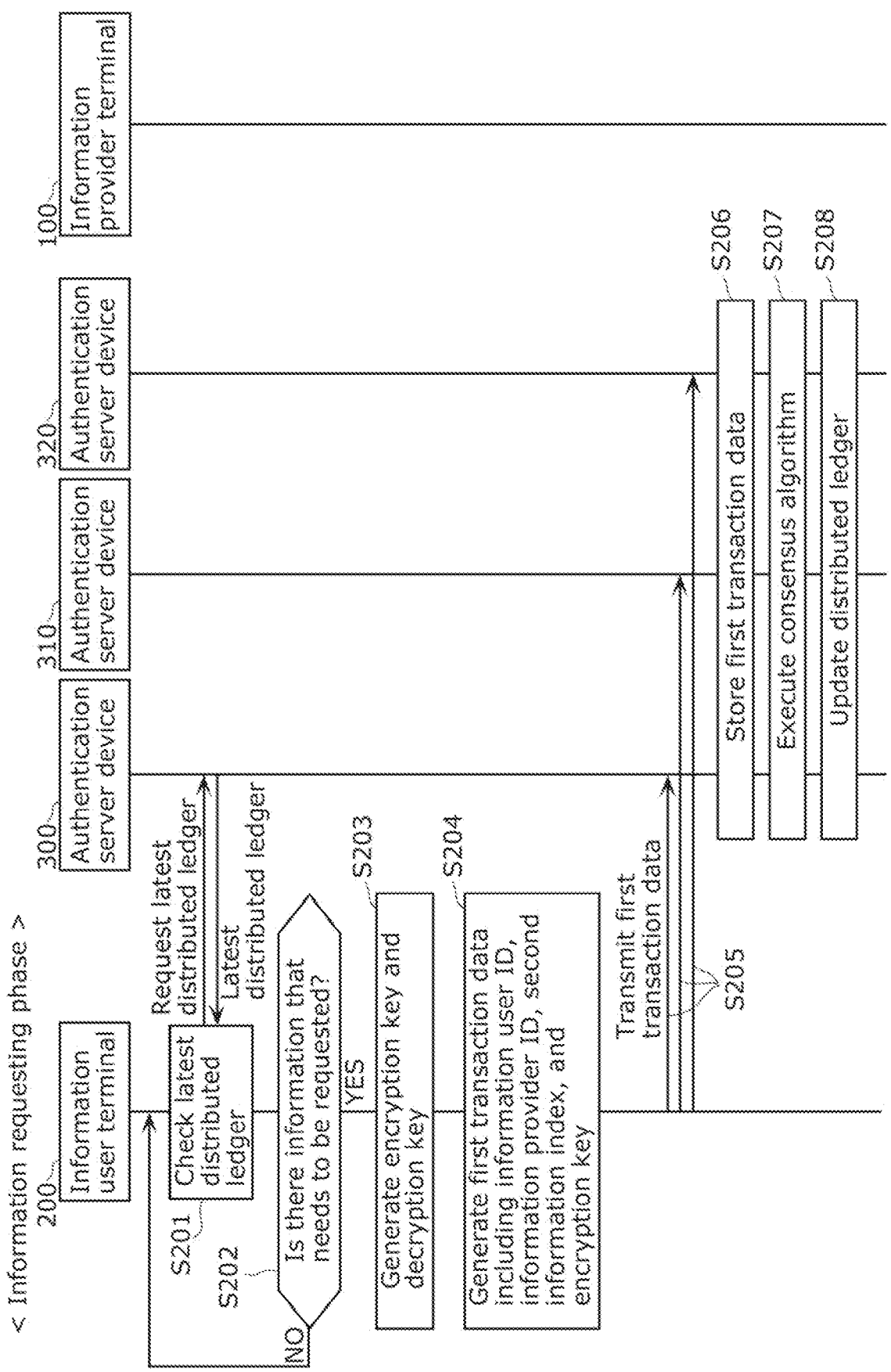
FIG. 11 is a sequence diagram showing an example of an operation performed in an information requesting phase according to the embodiment.

FIG. 11 is a sequence diagram showing an example of the operation performed in the information requesting phase according to the present embodiment.

First, information user terminal 200 checks, for example, the latest distributed ledger of authentication server device 300 (S201). In the example shown in FIG. 11, information user terminal 200 checks the latest distributed ledger of authentication server device 300 by, for example, transmitting a request for the latest ledger (or in other words, the latest distributed ledger) to authentication server device 300 and acquiring the latest ledger transmitted by authentication server device 300.

Next, information user terminal 200 references to (checks) the blocks included in the acquired latest distributed ledger, and determines whether there is information that needs to be requested for the information user to use (S202). Specifically, information user terminal 200 determines whether there is a second information index that indicates an index of first information that needs to be requested for the information user to use from among the information items indicated by the first information index published in the acquired latest distributed ledger.

If it is determined in step S202 that there is information that needs to be requested (YES in S202), information user terminal 200 generates an encryption key and a decryption key that are used for a transaction of the information that needs to be requested (S203). If it is determined in step S202 that there is no information that needs to be requested (NO in S202), information user terminal 200 returns to step S201, and performs the processing again.

Next, information user terminal 200 generates first transaction data that includes the information user ID, the information provider ID, the second information index, and the encryption key (S204).

Next, information user terminal 200 transmits the first transaction data generated in step S204 to authentication server devices 300, 310, and 320 (S205).

Next, each of authentication server devices 300, 310, and 320 stores the acquired first transaction data (S206).

Next, authentication server devices 300, 310, and 320 executes a consensus algorithm for determining the validity of the first transaction data (S207). After verifying the validity of the first transaction data, each of authentication server devices 300, 310, and 320 generates a block that includes the first transaction data.

Next, authentication server devices 300, 310, and 320 update the distributed ledger by writing the block generated as a result of the consensus algorithm being executed in step S207 into the distributed ledger (S208).

2.3 Information Providing Phase

Next, an operation performed by the information transaction system in the information providing phase will be described. In the information providing phase, an operation is performed in which the information user transmits a request for the first information to the information provider via the distributed ledger.

Figure 12:
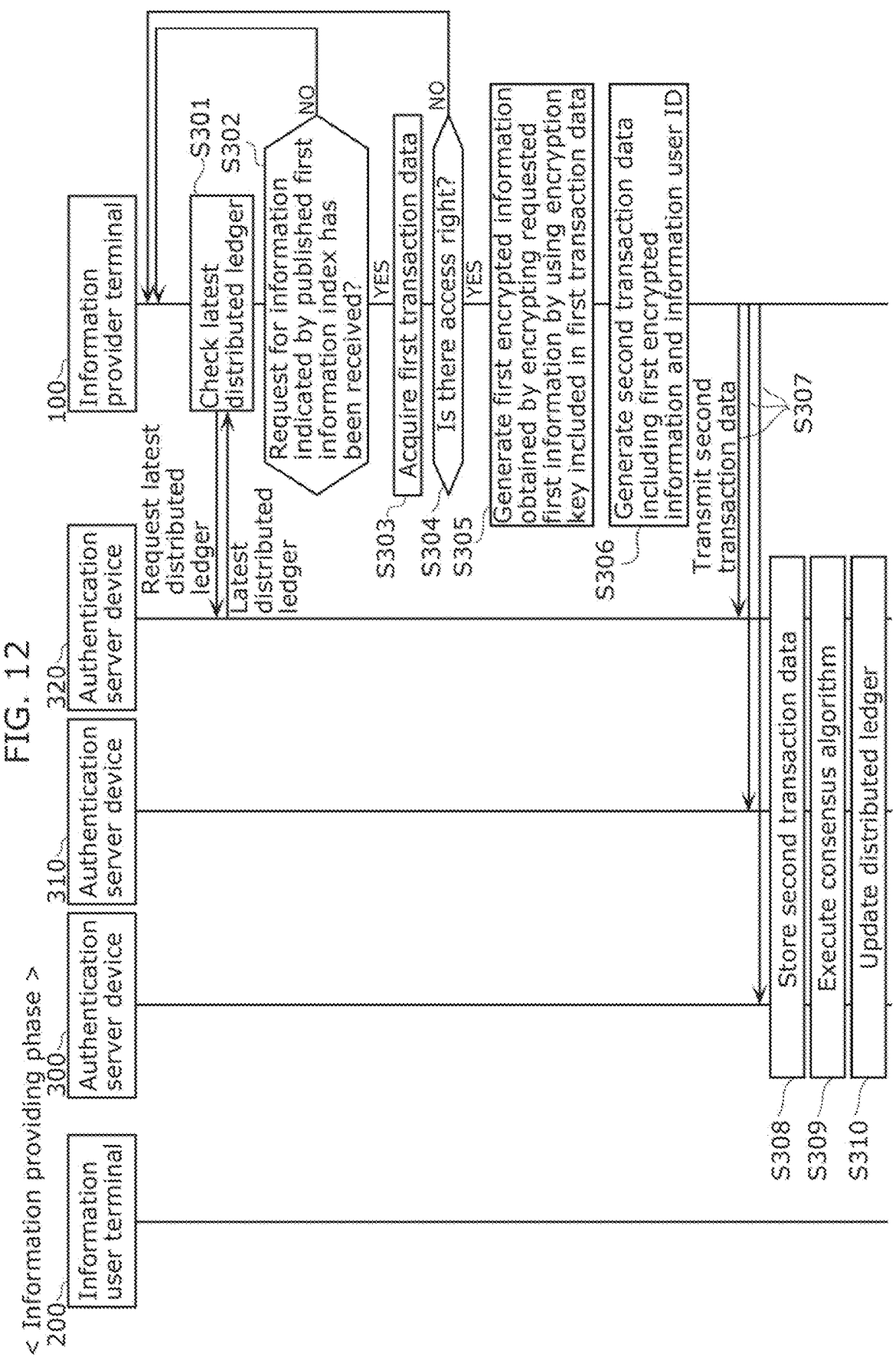
FIG. 12 is a sequence diagram showing an example of an operation performed in an information providing phase according to the embodiment.

FIG. 12 is a sequence diagram showing an example of the operation performed in the information providing phase according to the present embodiment.

First, information provider terminal 100 checks, for example, the latest distributed ledger of authentication server device 320 (S301). In the example shown in FIG. 12, information provider terminal 100 checks the latest distributed ledger of authentication server device 320 by, for example, transmitting a request for the latest ledger (or in other words, the latest distributed ledger) to authentication server device 320 and acquiring the latest ledger from authentication server device 320. Information provider terminal 100 may check the latest distributed ledger at a regular timing or an irregular timing. Information provider terminal 100 checks the latest distributed ledger transmitted from authentication server device 320 at that timing.

Next, information provider terminal 100 determines, based on the information provider ID, whether a request for information indicated by the published first information index has been received (S302). More specifically, information provider terminal 100 determines whether the first transaction data that includes the information provider ID and a request for information indicated by the published first information index is included in the transaction data items written in the latest distributed ledger.

If it is determined in step S302 that a request for information indicated by the published first information index has been received (YES in S302), information provider terminal 100 acquires the first transaction data that includes the second information index and is written in the latest distributed ledger (S303). If it is determined in step S302 that a request for information indicated by the published first information index has not been received (NO in S302), information provider terminal 100 returns to step S301, and performs the processing again.

Next, information provider terminal 100 determines whether there is an access right for the information (or in other words, the first information) indicated by the first information index for which the request was received (S304). More specifically, information provider terminal 100 determines whether there is an access right for the first information requested by the information user, which is indicated by the second information index included in the first transaction data acquired in step S303. If it is determined in step S304 that there is no access right for the information indicated by the first information index for which the request was received (NO in S304), information provider terminal 100 discards the acquired first transaction data, returns to step S301, and performs the processing again.

If it is determined in step S304 that there is an access right for the information indicated by the first information index for which the request was received (YES in S304), information provider terminal 100 generates encrypted information (or in other words, first encrypted information) by encrypting the requested first information (S305). More specifically, information provider terminal 100 generates encrypted information (or in other words, first encrypted information) by encrypting the requested first information by using the encryption key that is included in the first transaction data acquired in step S303 and was generated by information user terminal 200.

Next, information provider terminal 100 generates second transaction data that includes at least the first encrypted information generated in step S305 and the information user ID (S306).

Next, information provider terminal 100 transmits the second transaction data generated in step S306 to authentication server devices 300, 310, and 320 (S307).

Next, each of authentication server devices 300, 310, and 320 stores the acquired second transaction data (S308).

Next, authentication server devices 300, 310, and 320 execute a consensus algorithm for determining the validity of the second transaction data (S309). After verifying the validity of the second transaction data, each of authentication server devices 300, 310, and 320 generates a block that includes the second transaction data.

Next, authentication server devices 300, 310, and 320 update the distributed ledger by writing the block generated as a result of the consensus algorithm being executed in step S309 into the distributed ledger (S310).

2.4 Information Decryption Phase

Next, an operation performed by the information transaction system in the information decryption phase will be described. In the information decryption phase, an operation is performed in which the information user decrypts the first encrypted information provided by the information provider via the distributed ledger. The information decryption phase is performed after the information providing phase.

Figure 13:
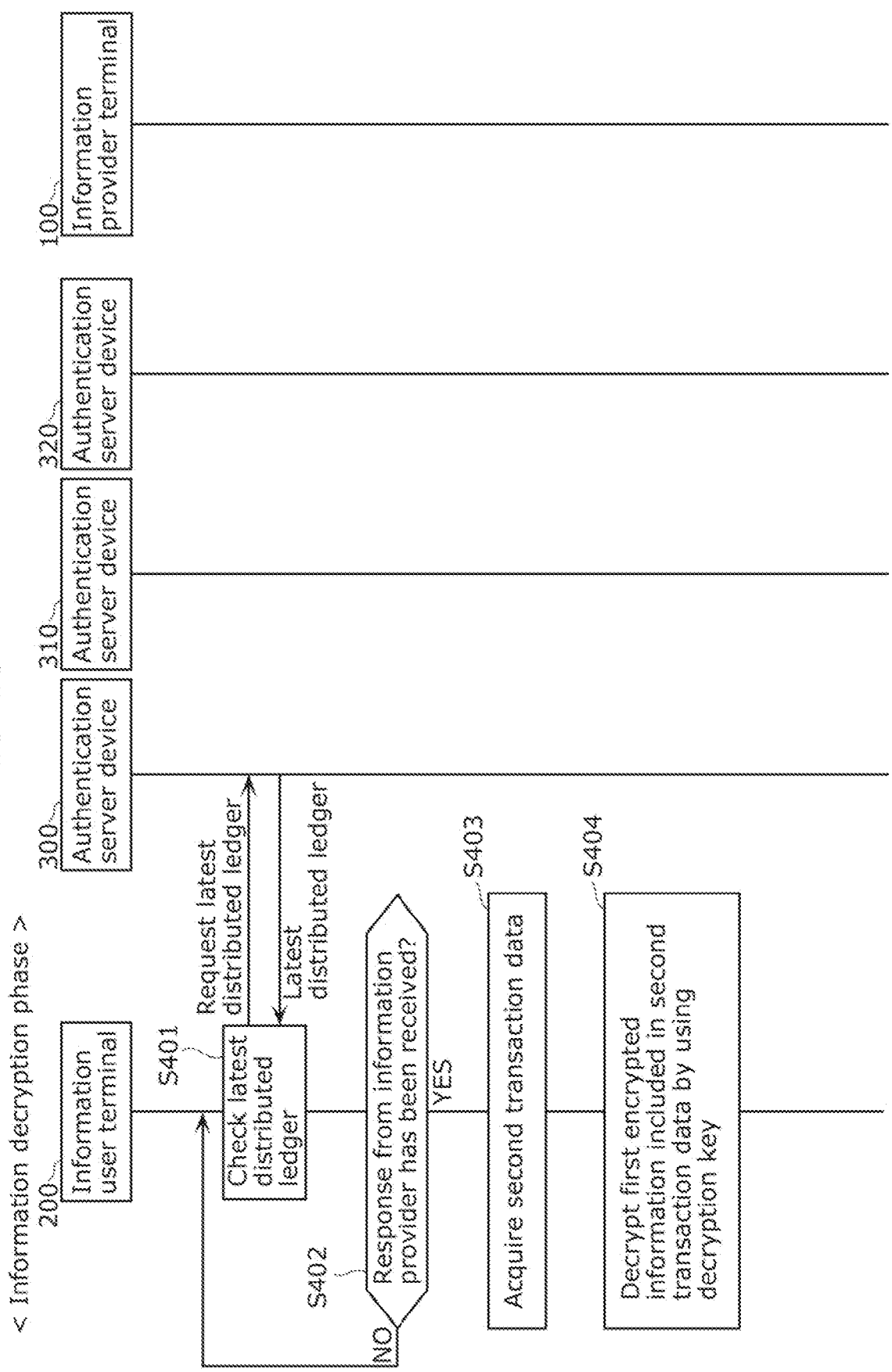
FIG. 13 is a sequence diagram showing an example of an operation performed in an information decryption phase according to the embodiment.

FIG. 13 is a sequence diagram showing an example of the operation performed in the information decryption phase according to the present embodiment.

First, information user terminal 200 checks, for example, the latest distributed ledger of authentication server device 300 (S401). In the example shown in FIG. 13, information user terminal 200 checks the latest distributed ledger of authentication server device 300 by, for example, transmitting a request for the latest ledger (or in other words, the latest distributed ledger) to authentication server device 300 and acquiring the latest ledger transmitted from authentication server device 300. Information user terminal 200 may check the latest distributed ledger at a regular timing or an irregular timing. Information user terminal 200 checks the latest distributed ledger transmitted from authentication server device 300 at that timing.

Next, information user terminal 200 references to (checks) the blocks included in the acquired latest distributed ledger, and determines, based on the information user ID, whether a response has been received from the information provider (S402). More specifically, information user terminal 200 determines whether the second transaction data that includes the information user ID and the first encrypted information generated by the information provider is included in the transaction data items written in the latest distributed ledger.

If it is determined in step S402 that a response has been received from the information provider (YES in S402), information user terminal 200 acquires the second transaction data that includes the information user ID and the first encrypted information and is written in the latest distributed ledger (S403). If it is determined in step S402 that a response has not been received from the information provider (NO in S402), information user terminal 200 returns to step S401, and performs the processing again.

Next, information user terminal 200 decrypts the first encrypted information included in the second transaction data acquired in step S403 by using a decryption key generated in step S203 in the information requesting phase (S404). In this way, the information user can acquire the first information requested in the information requesting phase.

3. Advantageous Effects, Etc.

With the information transaction method and the like of the embodiment described above, the information provider writes into the distributed ledger (registers in the blockchain) third transaction data that includes an index, or in other words, a first information index that indicates the name of information that can be provided by the information provider and the ID of the information, instead of the substantial information that can be provided by the information provider, and publishes the third transaction data. Then, the information provider writes, into the blockchain, both transaction data that indicates information requested by the information user and transaction data that includes the requested information encrypted by the information provider by using the encryption key provided from the information user. In this way, it is possible to implement the transaction method, with which transaction of information requested by the information user cannot be performed unless a history is recorded in the blockchain. That is, it is possible to implement an information transaction method and the like, with which information cannot be acquired without a history being recorded in a blockchain.

Information user terminal 200 selects information that the information user wants to use from the first information index published by the information provider, and transmits a list (second information index) of the selected information to the information provider via the distributed ledger. Also, information user terminal 200 provides the encryption key (public key) generated by the information user to the information provider when transmitting the second information index to the information provider via the distributed ledger, which prevents the information from being secretly seen and stolen by someone other than the information user.

More specifically, the information user references to the first information index that is public information written in the distributed ledger. If the information user finds the name of information that the information user wants to use in the first information index, the information user randomly generates an encryption key and a decryption key, and writes first transaction data that includes the ID of the information that the information user wants to use and the generated encryption key into the distributed ledger. When the information provider acquires the first transaction data written in the latest distributed ledger and is informed that the information of the information provider is requested, the information provider writes, into the distributed ledger, second transaction data that includes first encrypted information obtained by encrypting first information corresponding to the ID included in the first transaction data by using the encryption key included in the first transaction data. The information user acquires the second transaction data written in the latest distributed ledger. If it is determined that the first encrypted information encrypted by using the encryption key of the information user is included in the second transaction data, the information user decrypts the information using the decryption key held by the information user and thus obtains the information that the information user wants to use.

Accordingly, it is possible to implement an information transaction method and the like that prevent information from being secretly seen and stolen by someone other than the information user and from being acquired without a history being recorded in the blockchain.

Variation 1

Figure 14:
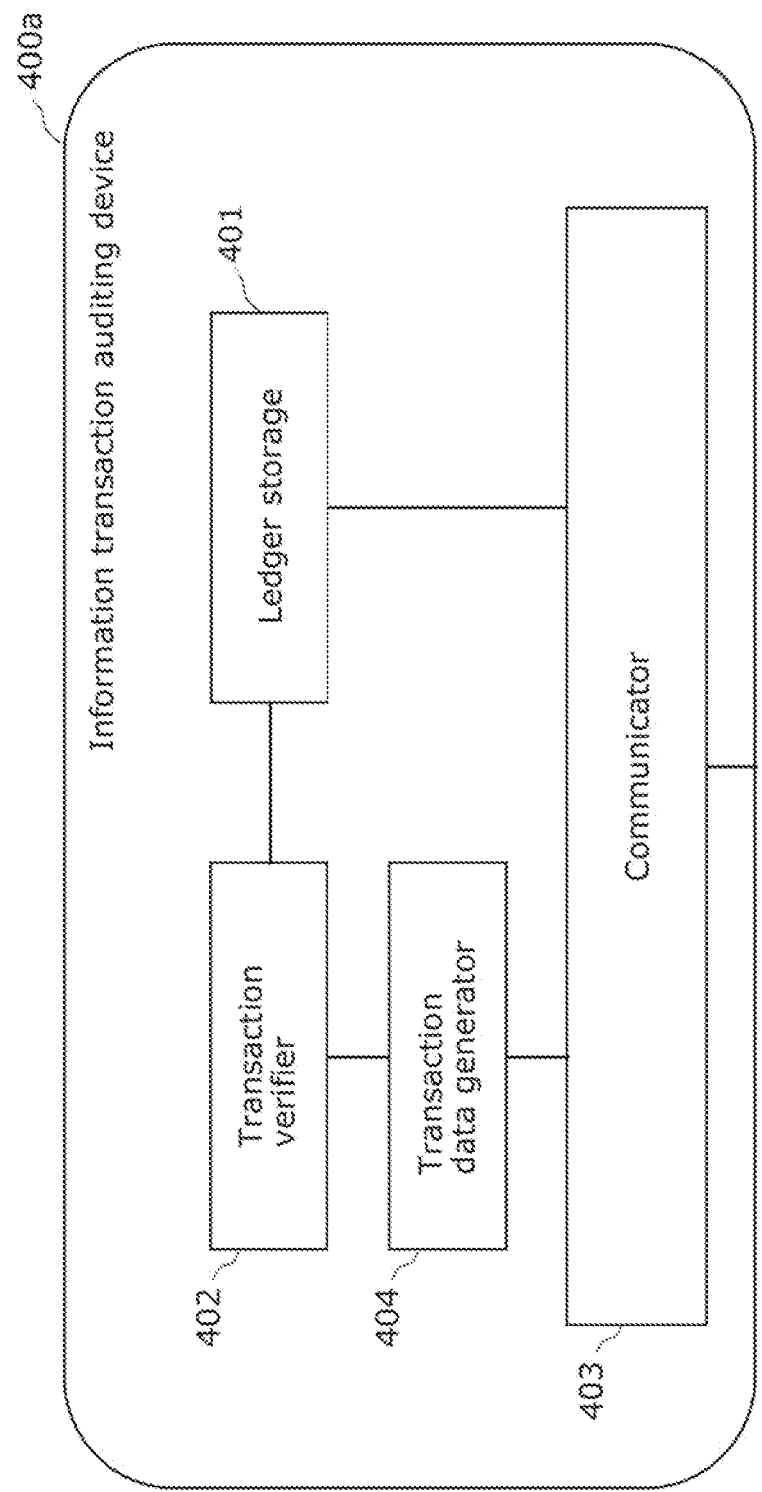
FIG. 14 is a diagram showing an example of a functional configuration of an information transaction auditing device according to Variation 1.

In the embodiment given above, an example has been described in which, if it is determined that there is an anomalous transaction, information transaction auditing device 400 transmits a notification to at least one of the information provider and the information user who are involved in the anomalous transaction, but the configuration is not limited thereto. Information transaction auditing device 400 may be configured to, if it is determined that there is an anomalous transaction, generate transaction data that includes information regarding the anomalous transaction and transmit the generated transaction data to authentication server devices 300, 310, and 320. This case will be described as Variation 1 by focusing on a difference from the embodiment given above, Information Transaction Auditing Device 400a FIG. 14 is a diagram showing an example of a functional configuration of information transaction auditing device 400a according to Variation 1. Structural elements that are the same as those of FIG. 9 and the like are given the same reference numerals, and a detailed description thereof will be omitted.

Information transaction auditing device 400a shown in FIG. 14 is different from information transaction auditing device 400 shown in FIG. 9 in that information transaction auditing device 400a further includes transaction data generator 404. Hereinafter, a description will be given by focusing on a difference from the embodiment given above.

Transaction Data Generator 404

Transaction data generator 404 generates, if it is determined by transaction verifier 402 that an anomalous transaction has occurred, transaction data (hereinafter referred to as "fourth transaction data") that includes information regarding the anomalous transaction. That is, transaction data generator 404 generates fourth transaction data that includes information regarding the anomalous first transaction from among all of the transactions written in the distributed ledger.

Even if it is determined by transaction verifier 402 that an anomalous transaction has not occurred, transaction data generator 404 may generate transaction data (hereinafter referred to as "fifth transaction data") that includes information indicating that an anomalous transaction has not occurred. That is, transaction data generator 404 may generate fifth transaction data that includes information regarding a second transaction determined as having no anomaly among the transactions written in the distributed ledger.

Then, when transaction data generator 404 generates the fourth transaction data or the fifth transaction data, transaction data generator 404 transmits the fourth transaction data or the fifth transaction data to at least one of authentication server devices 300, 310, and 320 via communicator 403.

In this way, at least one of the information provider and the information user who are involved in the first transaction acquires the fourth transaction data written in the distributed ledger, and is informed that the first transaction has an anomaly. Likewise, at least one of the information provider and the information user who are involved in the second transaction acquires the fifth transaction data written in the distributed ledger, and is informed that the second transaction has no anomaly.

Operation of Information Transaction System of Variation 1

Next, as an example of an operation performed by an information transaction system according to Variation 1, an operation of the information transaction system in a transaction auditing phase will be described.

Transaction Auditing Phase

An operation performed in the transaction auditing phase will be described. In the transaction auditing phase, an operation is performed in which the information transaction auditing device audits an anomaly in a transaction written in the distributed ledger.

Figure 15:
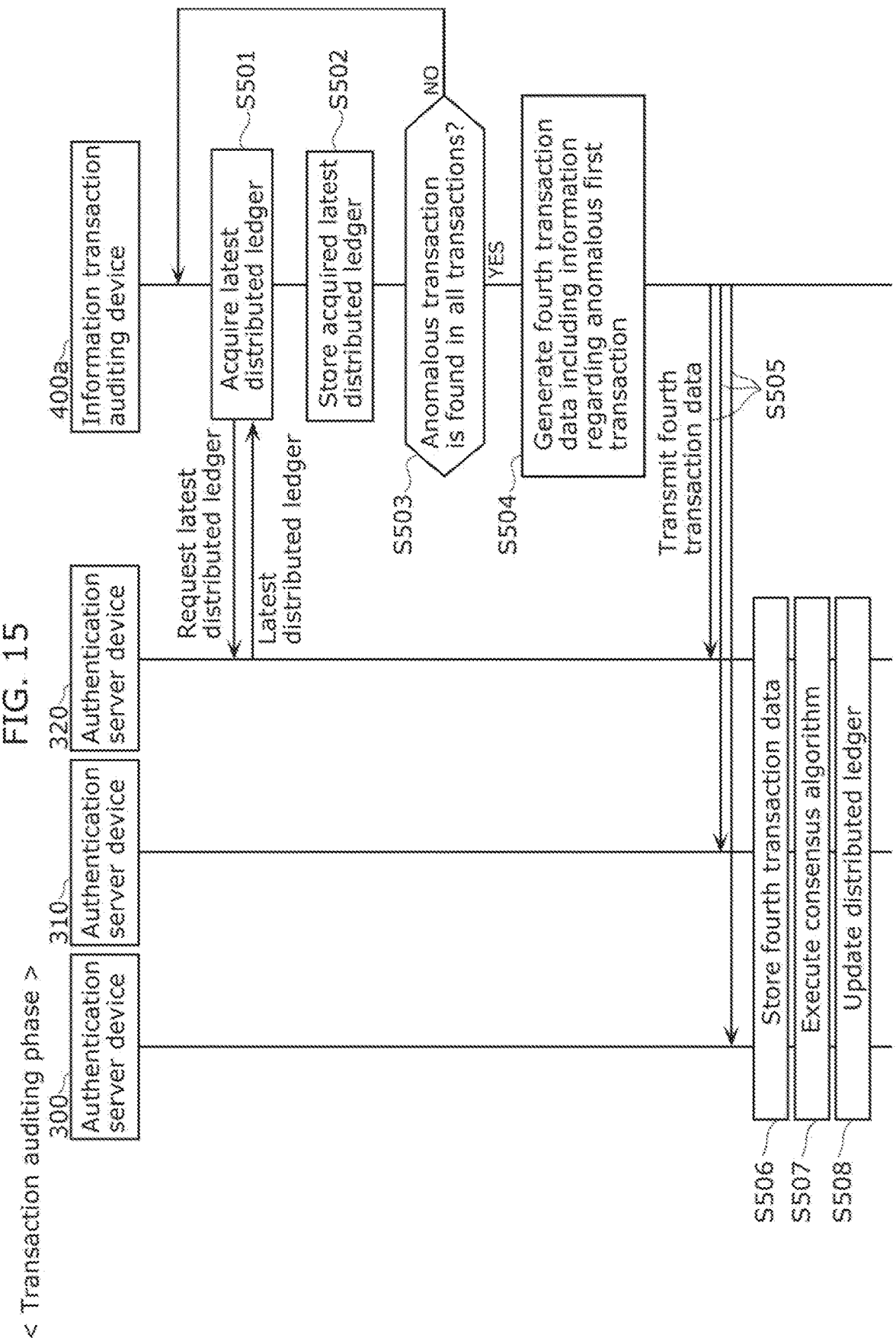
FIG. 15 is a sequence diagram showing an example of an operation performed in a transaction auditing phase according to Variation 1.

FIG. 15 is a sequence diagram showing an example of an operation performed in the transaction auditing phase according to Variation 1.

First, information transaction auditing device 400a acquires, for example, the latest distributed ledger of authentication server device 320 (S501). In the example shown in FIG. 15, information transaction auditing device 400a transmits, for example, a request for the latest ledger (or in other words, the latest distributed ledger) to authentication server device 320, and acquires the latest ledger transmitted from authentication server device 320. Information transaction auditing device 400a checks the latest distributed ledger at a regular timing.

Next, information transaction auditing device 400a stores the latest distributed ledger acquired in step S501 (S502).

Next, information transaction auditing device 400a checks the already stored distributed ledgers from the latest distributed ledger stored in step S502, and determines whether there is an anomalous transaction in all of the transactions written in the distributed ledger (S503). More specifically, information transaction auditing device 400a extracts all data included in the distributed ledger such as the first transaction data and the second transaction data, and determines whether there is an anomalous transaction by determining, for each of all transactions, whether the transaction has been successfully completed or whether the transaction is being successfully processed.

If it is determined in step S503 that there is no anomalous transaction (NO in S503), information transaction auditing device 400a returns the processing to step S501 and repeats the processing.

On the other hand, if it is determined in step S503 that there is an anomalous transaction (YES in S503), information transaction auditing device 400a generates fourth transaction data that includes information regarding the anomalous first transaction (S504).

Next, information transaction auditing device 400a transmits the fourth transaction data generated in step S504 to authentication server devices 300, 310, and 320 (S505).

Next, each of authentication server devices 300, 310, and 320 stores the acquired fourth transaction data (S506).

Next, authentication server devices 300, 310, and 320 execute a consensus algorithm for determining the validity of the fourth transaction data (S507). After verifying the validity of the fourth transaction data, each of authentication server devices 300, 310, and 320 generates a block that includes the fourth transaction data.

Next, authentication server devices 300, 310, and 320 update the distributed ledger by writing the block generated as a result of the consensus algorithm being executed in step S507 into the distributed ledger (S508).

In this way, at least one of the information provider and the information user who are involved in the first transaction can be informed that the first transaction has an anomaly by acquiring the fourth transaction data written in the distributed ledger.

Variation 2

In the embodiment given above, an example has been described in which information provider terminal 100 generates third transaction data that includes an index of one or more information items that are providable via the distributed ledger from among the information items owned by the information provider, and the access rights of the one or more information items, but the configuration is not limited thereto. Information provider terminal 100a may include, in the third transaction data, the hash value of the one or more information items that are providable via the distributed ledger, Hereinafter, this case will be described as Variation 2.

Information Provider Terminal 100a

Figure 16:
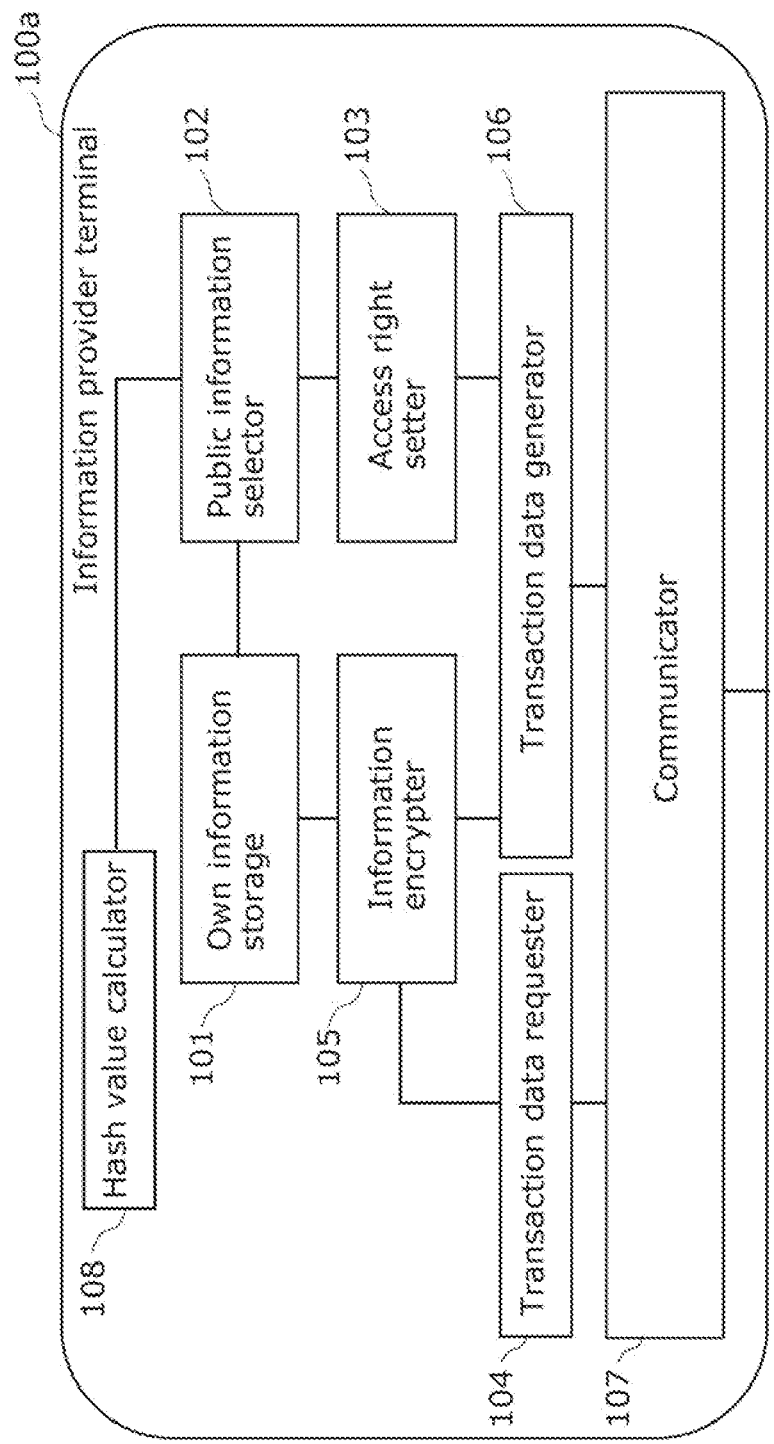
FIG. 16 is a diagram showing an example of a functional configuration of an information provider terminal according to Variation 2.

FIG. 16 is a diagram showing an example of a functional configuration of information provider terminal 100a according to Variation 2, Structural elements that are the same as those of FIG. 2 and the like are given the same reference numerals, and a detailed description thereof will be omitted.

Information provider terminal 100a shown in FIG. 16 is different from information provider terminal 100 shown in FIG. 2 in that information provider terminal 100a further includes hash value calculator 108. Hereinafter, a description will be given by focusing on a difference from the embodiment given above.

Hash Value Calculator 108

Hash value calculator 108 calculates a hash value for each of one or more information items included in the list of one or more information items that are providable via the distributed ledger from among the information items owned by the information provider.

Accordingly, in the present variation, transaction data generator 106 can generate third transaction data by further including, in the third transaction data, the hash values calculated for the one or more information items included in the list (first information index) of one or more information items that are providable via the distributed ledger.

As a result, the first information index and the hash values calculated for the one or more information items included in the first information index are published in the distributed ledger.

Information User Terminal 200a

Figure 17:
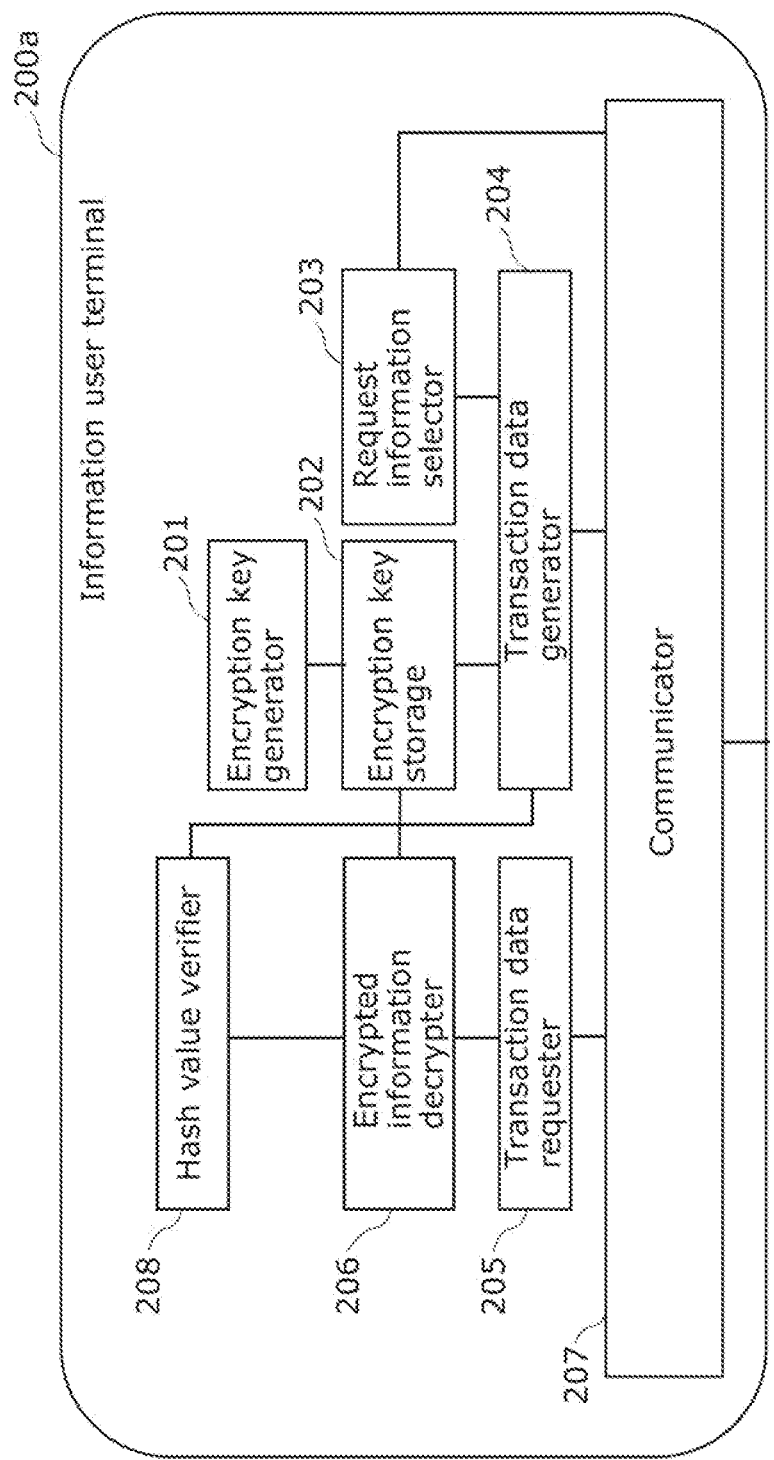
FIG. 17 is a diagram showing an example of a functional configuration of an information user terminal according to Variation 2.

FIG. 17 is a diagram showing an example of a functional configuration of information user terminal 200a according to Variation 2. Structural elements that are the same as those of FIG. 5 and the like are given the same reference numerals, and a detailed description thereof will be omitted.

Information user terminal 200a shown in FIG. 17 is different from information user terminal 200 shown in FIG. 5 in that information user terminal 200a further includes hash value verifier 208. Hereinafter, a description will be given by focusing on a difference from the embodiment given above.

Hash Value Verifier 208

Hash value verifier 208 acquires first information as a result of encrypted information decrypter 206 decrypting first encrypted information, and thereafter calculates a hash value (hereinafter referred to as "first hash value") for the first information.

Hash value verifier 208 compares a second hash value with the calculated first hash value, the second hash value corresponding to the first information from among the hash values of the one or more information items published in the distributed ledger.

As a result of comparison between the second hash value and the first hash value, if it is determined that the second hash value is different from the first hash value, hash value verifier 208 again causes transaction data generator 204 to generate first transaction data.

As described above, information user terminal 200a compares the first hash value of the acquired first information with the second hash value published in the distributed ledger. If it is determined that the first hash value and the second hash value match, information user terminal 200a completes the transaction of the first information. However, if it is determined that the first hash value and the second hash value do not match, information user terminal 200a transmits a request for resending the first information to information provider terminal 100a.

Operation of Information Transaction System of Variation 2

Next, as an example of an operation performed by an information transaction system according to Variation 2, operations performed by the information transaction system in an access right setting phase and an information decryption phase will be described.

Access Right Setting Phase

An operation performed in the access right setting phase according to Variation 2 will be described.

Figure 18:
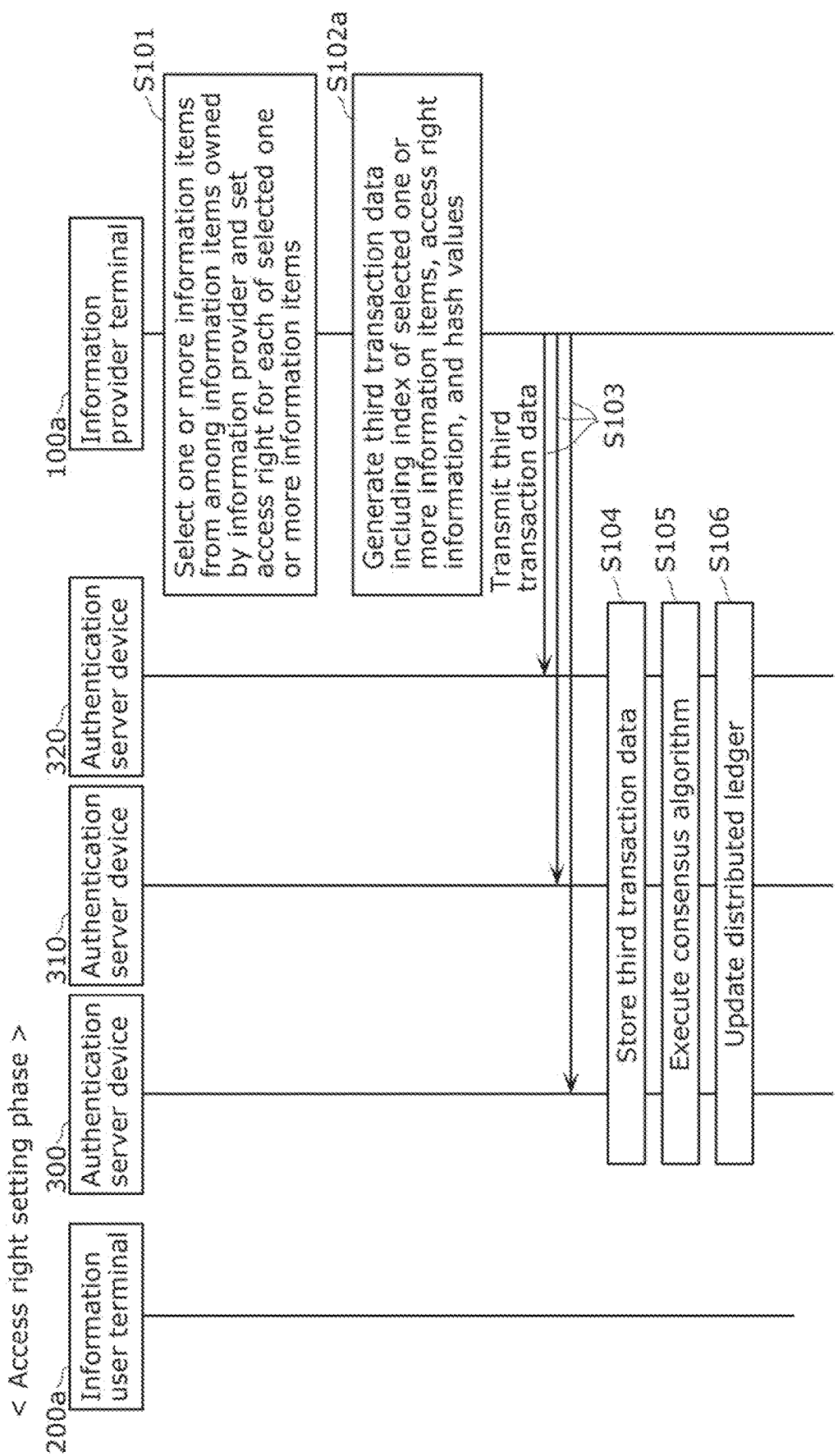
FIG. 18 is a sequence diagram showing an example of an operation performed in an access right setting phase according to Variation 2.

FIG. 18 is a sequence diagram showing an example of an operation performed in the access right setting phase according to Variation 2. Structural elements that are the same as those of FIG. 10 and the like are given the same reference numerals, and a detailed description thereof will be omitted. The operation performed in the access right setting phase shown in FIG. 18 is different from the operation performed in the access right setting phase shown in FIG. 10 in terms of an operation performed in step S102a.

Specifically, in step S102a, information provider terminal 100a generates third transaction data that includes an index (or in other words, a first information index) of the one or more information items selected in step S101, the access right information, and the hash values of the one or more information items. As described above, the hash values are hash values calculated for the one or more information items included in the first information index.

Information Decryption Phase

Next, an operation performed in the information decryption phase according to Variation 2 will be described.

Figure 19:
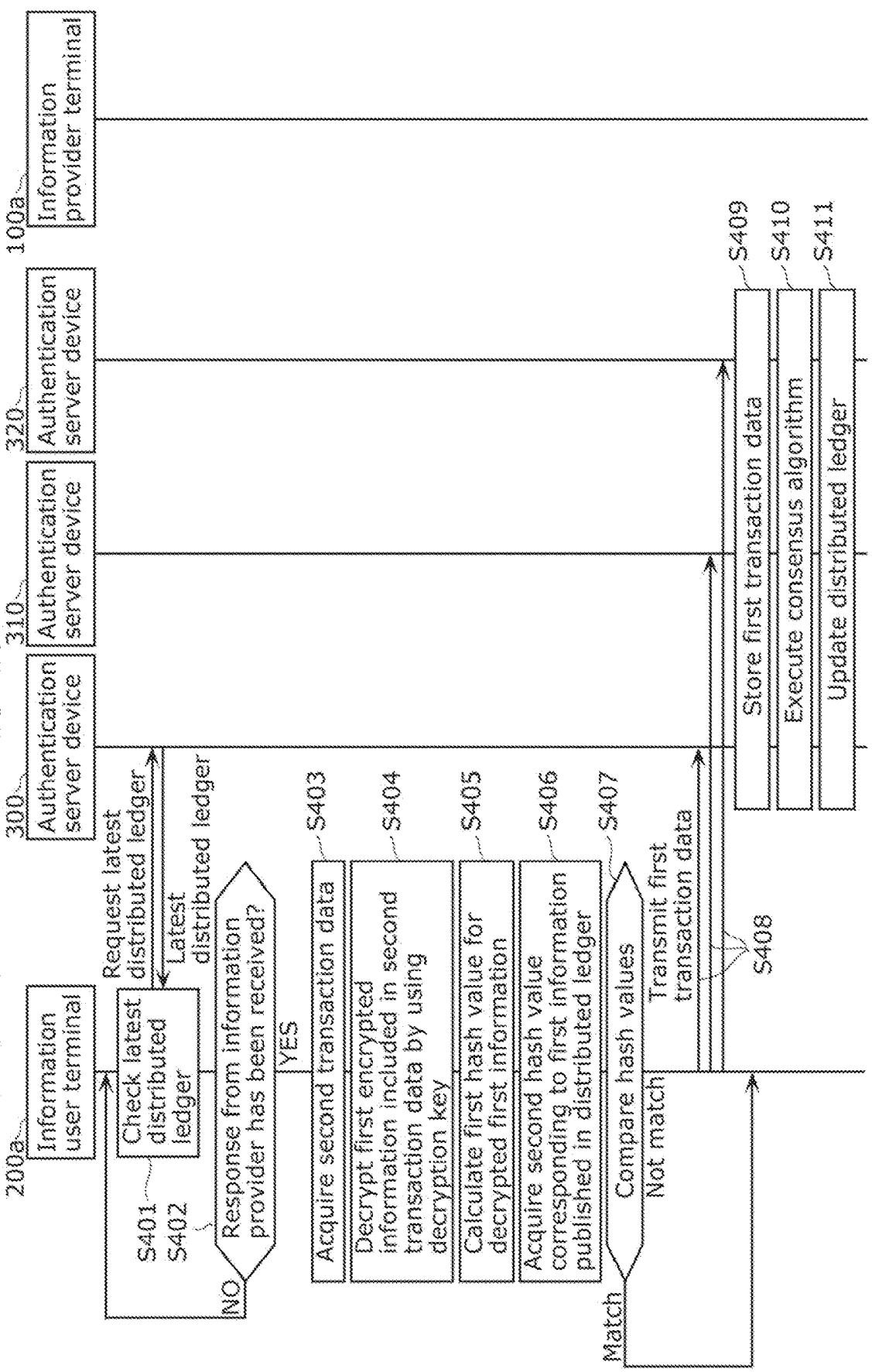
FIG. 19 is a sequence diagram showing an example of an operation performed in an information decryption phase according to Variation 2.

FIG. 19 is a sequence diagram showing an example of an operation performed in the information decryption phase according to Variation 2. Structural elements that are the same as those of FIG. 13 and the like are given the same reference numerals, and a detailed description thereof will be omitted. The operation performed in the information decryption phase shown in FIG. 19 is different from the operation performed in the information decryption phase shown in FIG. 13 in that step S405 and subsequent steps are added.

Specifically, first, in step S404, information user terminal 200a decrypts the first encrypted information included in the second transaction data by using the decryption key, and thus acquires the information requested in the information requesting phase.

Next, information user terminal 200a calculates a first hash value for the first information decrypted in step S404 (S405).

Next, information user terminal 200a acquires a second hash value that corresponds to the first information published in the distributed ledger (S406).

Next, information user terminal 200a compares the hash values (S407). More specifically, information user terminal 200a compares the first hash value of the first information calculated in step S405 with the second hash value of the first information acquired in step S406.

If it is determined in step S407 that the compared hash values match (Match in S407), the processing ends.

On the other hand, if it is determined in step S407 that the compared hash values do not match (Not match in S407), information user terminal 200a transmits (resend) the first transaction data generated in step S204 in the information requesting phase to authentication server devices 300, 310, and 320 (S408).

Then, each of authentication server devices 300, 310, and 320 stores the acquired first transaction data (S409).

Next, authentication server devices 300, 310, and 320 execute a consensus algorithm for determining the validity of the first transaction data (S410). After verifying the validity of the first transaction data, each of authentication server devices 300, 310, and 320 generates a block that includes the first transaction data.

Next, authentication server devices 300, 310, and 320 update the distributed ledger by writing the block generated as a result of the consensus algorithm being executed in step S410 into the distributed ledger (S411).

As described above, if it is determined that the first hash value and the second hash value match, information user terminal 200a completes the transaction of the first information. However, if it is determined that the first hash value and the second hash value do not match, information user terminal 200a transmits a request for resending the first information to information provider terminal 100a. Accordingly, information user terminal 200a can reliably acquire the correct first information requested by the information user.

Variation 3

In the embodiment and the variations given above, information user terminal 200 may pay a fee to the information provider after acquiring the first information by decrypting the first information in the information decryption phase. That is, as the operation of the information transaction system, an operation of a fee payment phase may be performed in the information decryption phase. Hereinafter, this case will be described as Variation 3 by focusing on a difference from the embodiment and the like given above.

Fee Payment Phase

Figure 20:
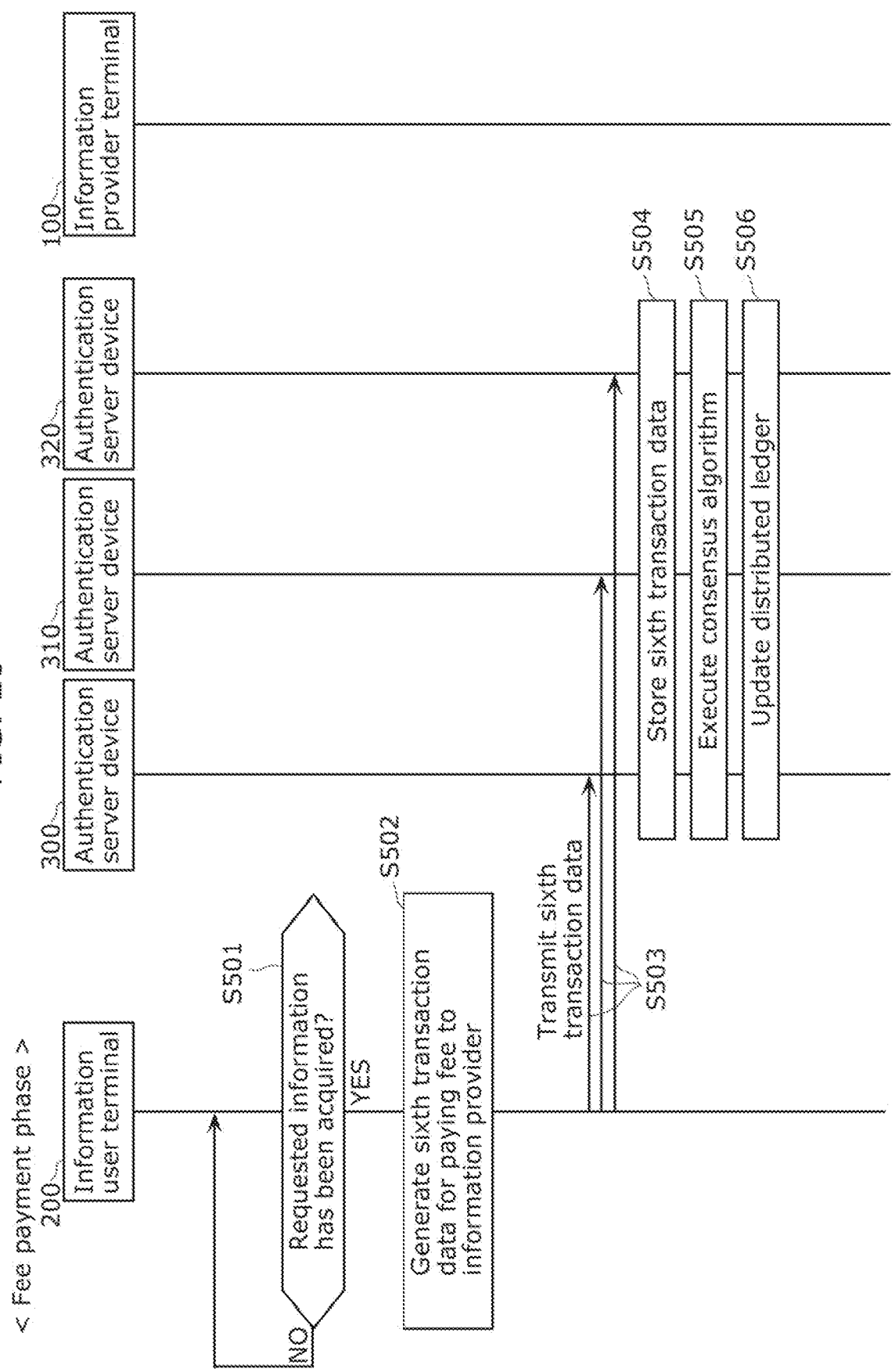
FIG. 20 is a sequence diagram showing an example of an operation performed in a fee payment phase according to Variation 3.

FIG. 20 is a sequence diagram showing an example of an operation performed in the fee payment phase according to Variation 3.

First, information user terminal 200 determines whether the first information requested in the information requesting phase has been acquired (S501).

If it is determined in step S501 that the requested first information has been acquired (YES in S501), information user terminal 200 generates sixth transaction data for paying a fee to the information provider (S502). As used herein, the fee may be paid using a cryptocurrency such as Bitcoin, cash, points that can be used exclusively only in the information transaction system, or any other equivalent form. Also, for example, data indicating a certificate for payment that proves that the information user paid the fee via, for example, bank transfer or the like obtained after the payment may be included in the sixth transaction data.

Next, information user terminal 200 transmits the sixth transaction data generated in step S502 to authentication server devices 300, 310, and 320 (S503).

Next, each of authentication server devices 300, 310, and 320 stores the acquired sixth transaction data (S504).

Next, authentication server devices 300, 310, and 320 execute a consensus algorithm for determining the validity of the sixth transaction data (S505). After verifying the validity of the sixth transaction data, each of authentication server devices 300, 310, and 320 generates a block that includes the sixth transaction data.

Next, authentication server devices 300, 310, and 320 update the distributed ledger by writing the block generated as a result of the consensus algorithm being executed in step S506 into the distributed ledger (S506).

In the foregoing, an example has been described in which information user terminal 200 pays a fee to the information provider each time the first information requested in the information requesting phase is acquired, but the configuration is not limited thereto. Information user terminal 200 may pay fees collectively to the information provider when the first information is acquired a predetermined number of times such as, for example, every 10 times, or each time a predetermined number of transactions are complete. Alternatively, information user terminal 200 may pay fees for the first information acquired in a predetermined period collectively to the information provider such as, for example, once a month.

Variation 4

In Variation 3, an example has been described in which the fee is paid from the information user to the information provider via the distributed ledger as a result of the sixth transaction data for paying a fee to the information provider generated by information user terminal 200 being written into the distributed ledger, but the configuration is not limited thereto. The information user may pay a fee to the information provider by using a smart contract created by information provider terminal 100. In this case, the information user may cause information user terminal 200 to generate transaction data indicating that the first information has been acquired, and transmit the generated information to the distributed ledger. Hereinafter, this case will be described as Variation 4 by focusing on a difference from Variation 3.

Smart Contract Setting Phase

Figure 21:
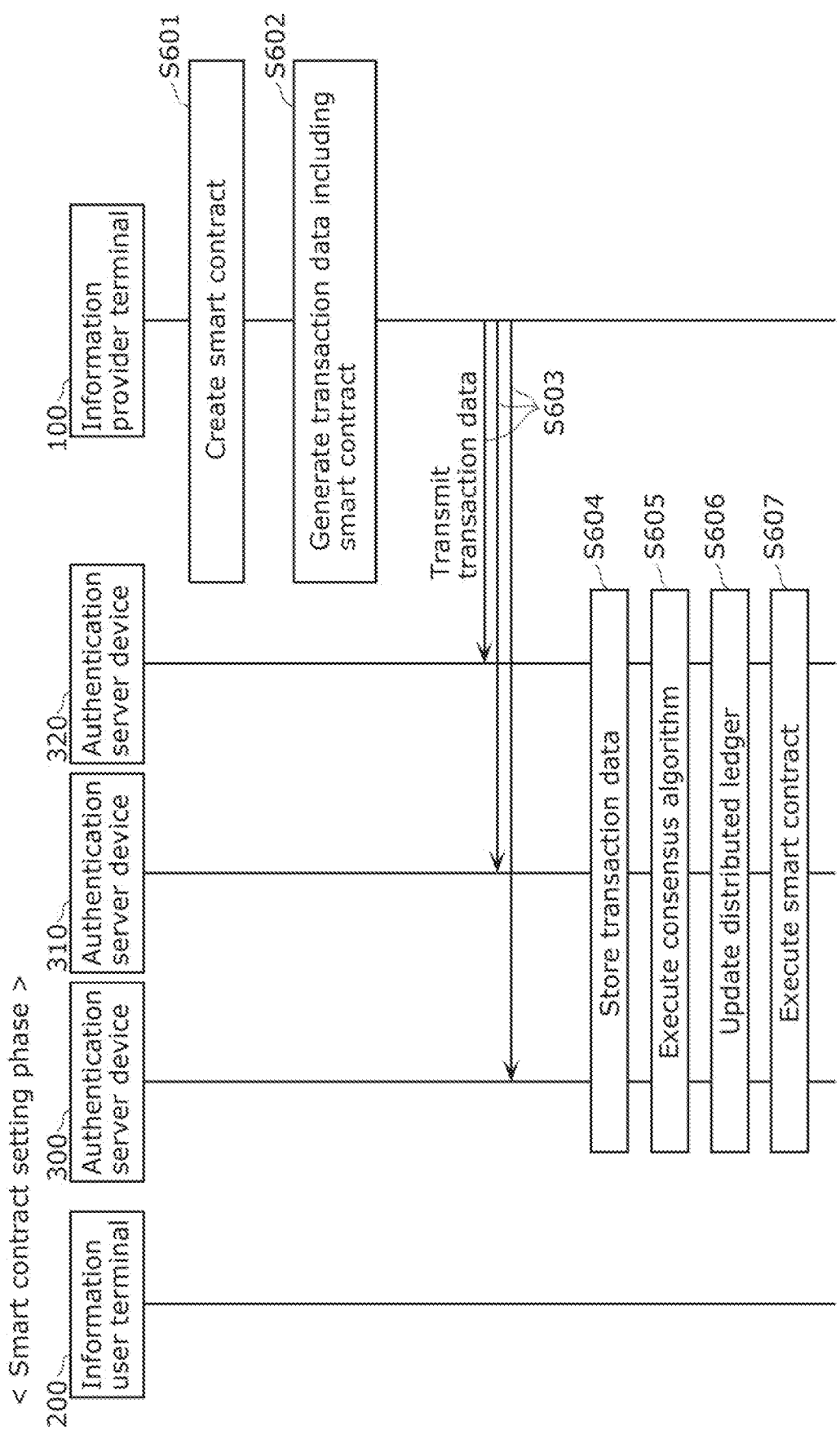
FIG. 21 is a sequence diagram showing an example of an operation performed in a smart contract setting phase according to Variation 4.

FIG. 21 is a sequence diagram showing an example of an operation performed in a smart contract setting phase according to Variation 4.

First, information provider terminal 100 creates a smart contract for paying a fee to the information provider (S601). The smart contract created here is a smart contract programmed to execute an action of paying a fee to the information provider by using the distributed ledger.

Next, information provider terminal 100 generates transaction data that includes the smart contract created in step S601 and, for example, an electronic signature that is associated with the information provider (S602).

Next, information provider terminal 100 transmits the transaction data generated in step S602 to authentication server devices 300, 310, and 320 (S603).

Next, each of authentication server devices 300, 310, and 320 stores the acquired transaction data (S604).

Next, authentication server devices 300, 310, and 320 execute a consensus algorithm for determining the validity of the transaction data (S605). After verifying the validity of the transaction data, each of authentication server devices 300, 310, and 320 generates a block that includes the transaction data.

Next, authentication server devices 300, 310, and 320 update the distributed ledger by writing the block generated as a result of the consensus algorithm being executed in step S605 into the distributed ledger (S606).

In the manner described above, the smart contract created by information provider terminal 100 is written into the distributed ledger.

Then, the smart contract is executable, or in other words, can be activated by being written into the distributed ledger (S607).

Information Decryption Phase

In the present variation, in the information decryption phase, information user terminal 200 writes transaction data indicating that the first information has been acquired into the distributed ledger after acquiring the first information obtained through decryption. In this way, the smart contract can pay the fee to the information provider. Hereinafter, this will be described with reference to FIG. 22.

Figure 22:
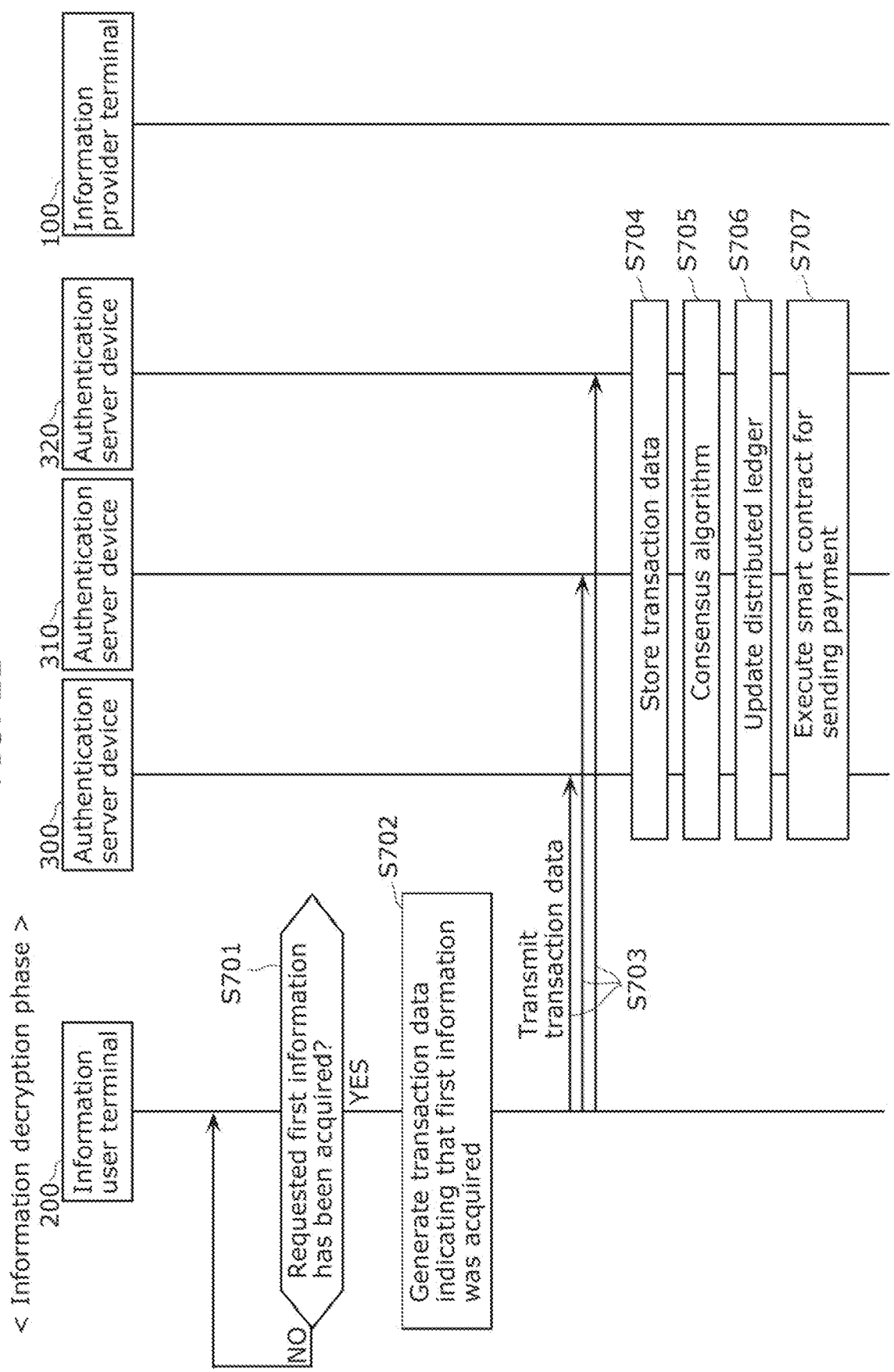
FIG. 22 is a sequence diagram showing an example of an operation performed in an information decryption phase according to Variation 4.

FIG. 22 is a sequence diagram showing an example of an operation performed in the information decryption phase according to Variation 4.

First, information user terminal 200 determines whether the first information requested in the information requesting phase has been acquired (S701).

If it is determined in step S701 that the first information requested in the information requesting phase has been acquired (YES in S701), information user terminal 200 generates transaction data indicating that the first information has been acquired (S702).

Next, information user terminal 200 transmits the transaction data generated in step S702 to authentication server devices 300, 310, and 320 (S703).

Next, each of authentication server devices 300, 310, and 320 stores the acquired transaction data (S704).

Next, authentication server devices 300, 310, and 320 execute a consensus algorithm for determining the validity of the transaction data (S705). After verifying the validity of the transaction data, each of authentication server devices 300, 310, and 320 generates a block that includes the transaction data.

Next, authentication server devices 300, 310, and 320 update the distributed ledger by writing the block generated as a result of the consensus algorithm being executed in step S705 into the distributed ledger (S706).

Then, each of authentication server devices 300, 310, and 320 executes a smart contract for executing a payment (S707). As a result, the smart contract can pay the fee to the information provider.

In the manner described above, the information user can pay a fee to the information provider by using the smart contract written into the distributed ledger. In the case of a system that uses a blockchain, the most time consuming processing is processing of executing the consensus algorithm. In the present variation, by using the smart contract, the number of execution of the consensus algorithm can be reduced as compared with that in Variation 3 described above. Accordingly, the time taken for each transaction can be shortened.

Variation 5

In the embodiment and the variations given above, an example has been described in which the information written into the distributed ledger and published is the first information index that indicates a list of one or more information items that are providable via the distributed ledger selected from among the information items owned by the information provider, but the configuration is not limited thereto. One or more information items that are providable via the distributed ledger and published may be used as the encrypted information encrypted using the public key of each information user.

More specifically, encrypted information and an encrypted information ID for uniquely identifying the encrypted information may be written in the distributed ledger of the plurality of authentication server devices, the encrypted information being obtained by encrypting one or more information items owned by the information provider by using the encryption key generated by each of one or more information user terminals 200.

In this case, information provider terminal 100 may acquire first transaction data that includes the following information written in the distributed ledger. Here, the first transaction data includes a first information user ID that is an identifier for uniquely identifying a first information user, an information provider ID that is an identifier for uniquely identifying the information provider, and a second information index that indicates an index of first information requested by the first information user among information items indicated by a first information index published in the distributed ledger by the information provider.

Then, information provider terminal 100 may generate second transaction data that includes the following information. That is, the second transaction data includes an encrypted information ID for identifying first encrypted information encrypted by using an encryption key generated by information user terminal 200 of the first information user among one or more encrypted information items corresponding to the first information designated by the second information index, the information provider ID, and the first information user ID.

Other Embodiments

In the foregoing, the information transaction system according to the present disclosure has been described by way of an embodiment, but the present disclosure is not limited to the embodiment given above. Other embodiments obtained by making various modifications that can be conceived by a person having ordinary skill in the art to the above embodiment as well as embodiments implemented by any combination of some of the structural elements of the above embodiment without departing from the scope of the present disclosure are also encompassed in the scope of the present disclosure. For example, the following configurations are also encompassed in the scope of the present disclosure.

(1) In the embodiment and the variations given above, an example has been described in which information provider terminal 100 and the like, information user terminal 200 and the like, and information transaction auditing device 400 transmit generated transaction data to all authentication server devices, or in other words, authentication server devices 300, 310, and 320, but the configuration is not limited thereto.

Information provider terminal 100 and the like, information user terminal 200 and the like, and information transaction auditing device 400 may transmit generated transaction data to any one of the authentication server devices, or one or more of the authentication server devices. In this case, the authentication server device that has received the transaction data transmits the received transaction data to any one of the other authentication server devices, or one or more of the other authentication server devices. With this configuration, the transaction data can be shared by all of the authentication server devices.

(2) In the embodiment and the variations given above, an example has been described in which the information provider checks the access right of the information user in the information requesting phase, but the configuration is not limited thereto. In the information requesting phase, the information provider may also check the access right when authentication server devices 300, 310, and 320 execute the consensus algorithm. In this case, if it is determined that the information user does not have an access right, the acquired transaction data may be discarded.

More specifically, in the information requesting phase, when one or more authentication server devices acquire first transaction data, whether the information user has the access right set in the first information may be determined. Then, if it is determined that the information user does not have the access right set in the first information, the one or more authentication server devices may discard the acquired first transaction data, without verifying the first transaction data.

(3) Each of the devices according to the embodiment given above is specifically a computer system that includes a microprocessor, a ROM, a RAM, a hard disk unit, a display unit, a keyboard, a mouse, and the like. In the RAM or the hard disk unit, a computer program is recorded. Each device implements its functions as a result of the microprocessor operating in accordance with the computer program. Here, the computer program is composed of a combination of a plurality of instruction codes that indicate instructions for the computer to implement predetermined functions.

(4) Some or all of the structural elements that constitute each of the devices according to the embodiment given above may be composed of a single system LSI (Large Scale Integration). The system LSI is a super multifunctional LSI manufactured by integrating a plurality of structural elements on a single chip, and is specifically a computer system that includes a microprocessor, a ROM, a RAM, and the like. A computer program is recorded in the RAM. As a result of the microprocessor operating in accordance with the computer program, the system LSI implements its functions.

Also, the units of the structural elements that constitute each of the devices according to the embodiment given above may be configured as individual single chips, or a part or all of them may be configured in a single chip.

Also, a system LSI is used here, but the LSI may be called IC, LSI, super LSI, or ultra LSI according to the degree of integration. Also, implementation of an integrated circuit is not limited to an LSI, and may be implemented by a dedicated circuit or a general-purpose processor. It is also possible to use an FPGA (Field Programmable Gate Array) that can be programmed after LSI production or a reconfigurable processor that enables reconfiguration of the connection and setting of circuit cells in the LSI.

Furthermore, if a technique for implementing an integrated circuit that can replace LSIs appears by another technique resulting from the progress or derivation of semiconductor technology, the functional blocks may be integrated by using that technique. Application of biotechnology or the like is possible.

(5) Some or all of the structural elements that constitute each of the devices described above may be composed of an IC card or a single module that can be attached and detached to and from the device. The IC card or the module is a computer system that includes a microprocessor, a ROM, a RAM, and the like. The IC card or the module may include the above-described super multifunctional LSI. The functions of the IC card or the module are implemented as a result of the microprocessor operating in accordance with a computer program. The IC card or the module may have tamper resistance.

(6) The present disclosure may be any of the methods described above. Alternatively, the present disclosure may be a computer program that implements any of the methods by using a computer, or may be a digital signal generated by the computer program.

Also, the present disclosure may be implemented by recording the computer program or the digital signal in a computer readable recording medium such as, for example, a flexible disk, a hard disk, a CD-ROM, a MO, a DVD, a DVD-ROM, a DVD-RAM, a BD (Blu-ray® Disc), or a semiconductor memory. Also, the present disclosure may be the digital signal recorded in the recording medium.

Also, the present disclosure may be implemented by transmitting the computer program or the digital signal via a telecommunication line, a wireless or wired communication line, a network as typified by the Internet, data broadcasting, or the like.

Also, the present disclosure may be a computer system that includes a microprocessor and a memory, wherein the computer program is recorded in the memory, and the microprocessor operates in accordance with the computer program.

Also, the present disclosure may be implemented by another independent computer system by recording the program or the digital signal on any of the recording media described above and transferring the program or the digital signal, or by transferring the program or the digital signal via the network described above or the like.

(7) The embodiment and the variations given above may be combined in any way.

INDUSTRIAL APPLICABILITY

The present disclosure is applicable to an information transaction method, a terminal, and a program. For example, the present disclosure is applicable to an information transaction method, a terminal, and a program that can be used in a service that protects transaction histories by transacting information via a blockchain.

The invention claimed is:

1. An information transaction method for a system including an information provider terminal used by an information provider, an information user terminal used by an information user, and a plurality of authentication server devices that are communicable with the information provider terminal and the information user terminal via a network, the information transaction method comprising:
  an information requesting phase of transmitting, by the information user, a request for first information to the information provider via a distributed ledger of one or more authentication server devices of the plurality of authentication server devices, the first information being from among information items indicated by a first information index published in the distributed ledger by the information provider; and
  an information providing phase of providing, by the information provider, the first information requested by the information user via the distributed ledger,
  wherein the information requesting phase includes:
    generating first transaction data that includes (i) an encryption key generated by the information user terminal, the encryption key being generated during generation of the first transaction data and corresponding to the first transaction data, (ii) an information user ID that is an identifier for uniquely identifying the information user, (iii) an information provider ID that is an identifier for uniquely identifying the information provider, and (iv) a second information index that indicates an index of the first information requested by the information user;
    transmitting, by the information user terminal, the first transaction data to the one or more authentication server devices;
    transmitting, by the one or more authentication server devices, the first transaction data to at least one authentication server device other than the one or more authentication server devices of the plurality of authentication server devices; and
    updating, by the plurality of authentication server devices, the distributed ledger after verifying the first transaction data to write the first transaction data into the distributed ledger, and
  wherein the information providing phase includes:
    acquiring, by the information provider terminal, the first transaction data written in the distributed ledger;
    generating, by the information provider terminal, first encrypted information by encrypting the first information requested by the information user using the encryption key included in the first transaction data acquired from the distributed ledger, the first information being designated by the second information index included in the first transaction data acquired from the distributed ledger;

generating, by the information provider terminal, second transaction data that includes the information provider ID, the information user ID, and the first encrypted information;

transmitting, by the information provider terminal, the second transaction data to the one or more authentication server devices; and updating, by the one or more authentication server devices, the distributed ledger after verifying the second transaction data to write the second transaction data into the distributed ledger, the second transaction data including the first encrypted information generated by encrypting the first information requested by the information user using the encryption key included in the first transaction data acquired from the distributed ledger.

2. The information transaction method according to claim 1, further comprising:

an information decryption phase performed after the information providing phase, the information decryption phase being a phase of decrypting, by the information user, the first encrypted information provided from the information provider via the distributed ledger, wherein the information decryption phase includes:
  acquiring, by the information user terminal, the second transaction data written in the distributed ledger; and
  acquiring, by the information user terminal, the first information by decrypting the first encrypted information included in the second transaction data acquired, by using a decryption key generated by the information user terminal together with the encryption key, the decryption key being different from the encryption key.

3. The information transaction method according to claim 2, wherein the acquiring, by the information provider terminal, the first transaction data includes acquiring the first transaction data written in the distributed ledger, based on the information provider ID, and the acquiring, by the information user terminal, the second transaction data includes acquiring the second transaction data written in the distributed ledger, based on the information user ID.

4. The information transaction method according to claim 2, wherein the plurality of authentication server devices have a transaction data transmission function, the information providing phase includes, in the acquiring, by the information provider terminal, the first transaction data, acquiring, by the information provider terminal, the first transaction data by the one or more authentication server devices transmitting the first transaction data written in the distributed ledger to the information provider terminal based on the information provider ID, and the information decryption phase includes, in the acquiring, by the information user terminal, the second transaction data, acquiring, by the information user terminal, the second transaction data by the one or more authentication server devices transmitting the second transaction data written in the distributed ledger to the information user terminal based on the information user ID.

5. The information transaction method according to claim 2, wherein the first information index indicates a list of one or more information items that are providable via the distributed ledger among information items owned by the information provider, the information transaction method further comprises:
  an access right setting phase performed prior to the information requesting phase, the access right setting phase being a phase of setting, by the information provider, access rights for the one or more information items included in the list, and the access right setting phase includes:
  generating, by the information provider terminal, third transaction data that includes the first information index, access right information that indicates the access rights set for the one or more information items included in the list, date and time, and a signature of the information provider;
  transmitting, by the information provider terminal, the third transaction data to the one or more authentication server devices; and
  updating, by the one or more authentication server devices, the distributed ledger after verifying the third transaction data to write the third transaction data into the distributed ledger and publish the first information index in the distributed ledger.

6. The information transaction method according to claim 5, wherein the information requesting phase includes:
  determining, by the information user terminal, whether the information user has an access right set in the first information prior to generating the first transaction data; and
  generating, by the information user terminal, the first transaction data when it is determined that the information user has the access right set in the first information.

7. The information transaction method according to claim 6, wherein the information requesting phase includes:
  determining, by the one or more authentication server devices, whether the information user has the access right set in the first information upon acquiring the first transaction data; and
  when it is determined that the information user does not have the access right set in the first information, discarding, by the one or more authentication server devices, the first transaction data acquired, without verifying the first transaction data.

8. The information transaction method according to claim 5, wherein the access right setting phase includes:
  generating, by the information provider terminal, the third transaction data by further including, in the third transaction data, hash values calculated for the one or more information items included in the list; and
  updating, by the one or more authentication server devices, the distributed ledger after verifying the third transaction data to write the third transaction data into the distributed ledger and publish the first information index and the hash values in the distributed ledger, and the information decryption phase further includes:
  calculating, by the information user terminal, a first hash value of the first information after acquiring the first information by decrypting the first encrypted information; and comparing, by the information user terminal, the first hash value with a second hash value that corresponds to the first information among the hash values published in the distributed ledger.

9. The information transaction method according to claim 8,
wherein the information decryption phase further includes:
again generating, by the information user terminal, the first transaction data when it is determined from the comparison between the first hash value and the second hash value that the first hash value is different from the second hash value;
transmitting, by the information user terminal, the first transaction data generated again to the one or more authentication server devices;
transmitting, by the one or more authentication server devices, the first transaction data to the at least one authentication server device other than the one or more authentication server devices of the plurality of authentication server devices; and
updating, by the plurality of authentication server devices, the distributed ledger after verifying the first transaction data to write the first transaction data into the distributed ledger.

10. The information transaction method according to claim 2,
wherein the information decryption phase further includes:
paying, by the information user, a fee to the information provider when the first information is acquired.

11. The information transaction method according to claim 10,
wherein the paying the fee includes paying, by the information user, when the first information is acquired a predetermined number of times, the fee for the first information acquired the predetermined number of times to the information provider.

12. The information transaction method according to claim 2,
wherein the information decryption phase further includes:
paying, by the information user, a fee to the information provider every predetermined period, the fee being for the first information acquired during the predetermined period.

13. The information transaction method according to claim 10,
wherein the paying the fee includes paying, by the information user, the fee to the information provider by using a smart contract written in the distributed ledger.

14. The information transaction method according to claim 1,
wherein the system further includes an information transaction auditing device that audits an information transaction,
the information transaction method further comprises: a transaction auditing phase of auditing, by the information transaction auditing device, an anomaly in transactions written in the distributed ledger, and
the transaction auditing phase includes:
checking, by the information transaction auditing device, the distributed ledger to determine, for each of the transactions written in the distributed ledger, whether the transaction has an anomaly; and
transmitting, by the information transaction auditing device, to at least one of the information provider or the information user involved in a first transaction determined as having an anomaly among the transactions written in the distributed ledger, a notification informing that the first transaction has an anomaly.

15. The information transaction method according to claim 1,
wherein the system further includes an information transaction auditing device that audits an information transaction,
the information transaction method further comprises: a transaction auditing phase of auditing, by the information transaction auditing device, an anomaly in transactions written in the distributed ledger,
the transaction auditing phase includes:
checking, by the information transaction auditing device, the distributed ledger to determine, for each of the transactions written in the distributed ledger, whether the transaction has an anomaly;
generating, by the information transaction auditing device, fourth transaction data that includes information regarding a first transaction determined as having an anomaly among the transactions written in the distributed ledger;
transmitting, by the information transaction auditing device, the fourth transaction data to the one or more authentication server devices;
updating, by the one or more authentication server devices, the distributed ledger after verifying the fourth transaction data to write the fourth transaction data into the distributed ledger; and
acquiring, by at least one of the information provider or the information user involved in the first transaction, the fourth transaction data written in the distributed ledger and being informed that the first transaction has an anomaly.

16. The information transaction method according to claim 15,
wherein the transaction auditing phase includes:
generating, by the information transaction auditing device, fifth transaction data that includes information regarding a second transaction determined as having no anomaly among the transactions written in the distributed ledger;
transmitting, by the information transaction auditing device, the fifth transaction data to the one or more authentication server devices;
updating, by the one or more authentication server devices, the distributed ledger after verifying the fifth transaction data to write the fifth transaction data into the distributed ledger; and
acquiring, by at least one of the information provider or the information user involved in the second transaction, the fifth transaction data written in the distributed ledger and being informed that the second transaction has no anomaly.

17. An information transaction method for a system including one or more information provider terminals used by one or more information providers, one or more information user terminals used by one or more information users, and a plurality of authentication server devices that are communicable with the one or more information provider terminals and the one or more information user terminals via a network,
wherein encrypted information items and encrypted information IDs are written in a distributed ledger of the plurality of authentication server devices, the encrypted information items being obtained by encrypting one or more information items owned by the one or more information providers by using encryption keys generated by the one or more information user terminals, and the encrypted information IDs being IDs for uniquely identifying the encrypted information items, the information transaction method comprising:

an information requesting phase of transmitting, by an information user that is one of the one or more information users, a request for first information to an information provider that is one of the one or more information providers via the distributed ledger of one or more authentication server devices of the plurality of authentication server devices, the first information being from among information items indicated by a first information index published in the distributed ledger by the information provider; and an information providing phase of providing, by the information provider, the first information requested by the information user via the distributed ledger, wherein the information requesting phase includes:
   generating first transaction data that includes (i) a first information user ID that is an identifier for uniquely identifying a first information user, (ii) an information provider ID that is an identifier for uniquely identifying an information provider who is one of the one or more information providers, and (iii) a second information index that indicates an index of first information requested by the first information user;
   transmitting, by the information user terminal, the first transaction data to the one or more authentication server devices;
   transmitting, by the one or more authentication server devices, the first transaction data to at least one authentication server device other than the one or more authentication server devices of the plurality of authentication server devices; and
   updating, by the plurality of authentication server devices, the distributed ledger after verifying the first transaction data to write the first transaction data into the distributed ledger, and wherein the information providing phase includes:
   acquiring, by the information provider terminal, the first transaction data written in the distributed ledger;
   generating, by the information provider terminal, second transaction data that includes an encrypted information ID, the information provider ID, and the first information user ID, the encrypted information ID being an ID for identifying first encrypted information among one or more encrypted information items corresponding to the first information designated by the second information index included in the first transaction data acquired from the distributed ledger, the first encrypted information being generated by encrypting the first information requested by the information user using an encryption key generated by the information user terminal of the first information user;
   transmitting, by the information provider terminal, the second transaction data to the plurality of authentication server devices; and
   updating, by the plurality of authentication server devices, the distributed ledger after verifying the second transaction data to write the second transaction data into the distributed ledger, the second transaction data including the first encrypted information generated by encrypting the first information requested by the information user using the encryption key generated by the information user terminal of the first information user.

18. An information user terminal for a system including an information provider terminal used by an information provider, the information user terminal used by an information user, and a plurality of authentication server devices that are communicable with the information provider terminal and the information user terminal via a network, the information user terminal comprising:

a processor; and a non-transitory memory having stored thereon executable instructions, which when executed, cause the processor to perform:
   generating first transaction data that includes (i) an encryption key generated by the information user terminal, (ii) an information user ID that is an identifier for uniquely identifying the information user, (iii) an information provider ID that is an identifier for uniquely identifying the information provider, and (iv) a second information index that indicates an index of first information requested by the information user among information items indicated by a first information index published in a distributed ledger of the plurality of authentication server devices by the information provider, the first transaction data being written in the distributed ledger; and
   transmitting the first transaction data to one or more authentication server devices of the plurality of authentication server devices to cause the one or more authentication server devices to transmit the first transaction data to at least one authentication server device other than the one or more authentication server devices of the plurality of authentication server devices, and the plurality of authentication server devices to update the distributed ledger after verifying the first transaction data to write the first transaction data into the distributed ledger, wherein the information provider terminal:
   acquires the first transaction data written in the distributed ledger;
   generate first encrypted information by encrypting the first information requested by the information user using the encryption key included in the first transaction data acquired from the distributed ledger, the first information being designated by the second information index included in the first transaction data acquired from the distributed ledger;
   generates second transaction data that includes the information provider ID, the information user ID, and the first encrypted information; and
   transmits the second transaction data to one or more authentication server devices of the plurality of authentication server devices to cause the one or more authentication server devices to write the second transaction data into the distributed ledger, the second transaction data including the first encrypted information generated by encrypting the first information requested by the information user using the encryption key included in the first transaction data acquired from the distributed ledger.

19. A non-transitory computer-readable recording medium having a program recorded thereon for causing a computer to execute an information transaction method for a system including an information provider terminal used by an information provider, an information user terminal used by an information user, and a plurality of authentication server devices that are communicable with the information provider terminal and the information user terminal via a network, the information transaction method comprising:

an information requesting phase of transmitting, by the information user, a request for first information to the information provider via a distributed ledger of one or more authentication server devices of the plurality of authentication server devices, the first information being from among information items indicated by a first information index published in the distributed ledger by the information provider; and an information providing phase of providing, by the information provider, information requested by the information user via the distributed ledger, wherein the information requesting phase includes:

generating first transaction data that includes (i) an encryption key generated by the information user terminal, the encryption key being generated during generation of the first transaction data and corresponding to the first transaction data, (ii) an information user ID that is an identifier for uniquely identifying the information user, (iii) an information provider ID that is an identifier for uniquely identifying the information provider, and (iv) a second information index that indicates an index of first information requested by the information user;

transmitting, by the information user terminal, the first transaction data to the one or more authentication server devices;

transmitting, by the one or more authentication server devices, the first transaction data to at least one authentication server device other than the one or more authentication server devices of the plurality of authentication server devices; and updating, by the plurality of authentication server devices, the distributed ledger after verifying the first transaction data to write the first transaction data into the distributed ledger, and wherein the information providing phase includes:

acquiring, by the information provider terminal, the first transaction data written in the distributed ledger;

generating, by the information provider terminal, first encrypted information by encrypting the first information requested by the information user using the encryption key included in the first transaction data acquired from the distributed ledger, the first information being designated by the second information index included in the first transaction data acquired from the distributed ledger;

generating, by the information provider terminal, second transaction data that includes the information provider ID, the information user ID, and the first encrypted information;

transmitting, by the information provider terminal, the second transaction data to the one or more authentication server devices; and updating, by the one or more authentication server devices, the distributed ledger after verifying the second transaction data to write the second transaction data into the distributed ledger, the second transaction data including the first encrypted information generated by encrypting the first information requested by the information user using the encryption key included in the first transaction data acquired from the distributed ledger.

* * * * *